(12) United States Patent
Chen et al.

(10) Patent No.: US 7,039,784 B1
(45) Date of Patent: May 2, 2006

(54) VIDEO DISTRIBUTION SYSTEM USING DYNAMIC DISK LOAD BALANCING WITH VARIABLE SUB-SEGMENTING

(75) Inventors: Monsong Chen, Katonah, NY (US);
Dah-Weih Duan, Yorktown Heights, NY (US); Aparna Pappu, White Plain, NY (US); Bodhi Mukherjee, Hopewell Junction, NY (US)

(73) Assignee: Info Value Computing Inc., Elmsford, NY (US)

( * ) Notice: Subject to any disclaimer, the term of this patent is extended or adjusted under 35 U.S.C. 154(b) by 872 days.

(21) Appl. No.: 10/027,991

(22) Filed: Dec. 20, 2001

(51) Int. Cl.
*G06F 12/00* (2006.01)

(52) U.S. Cl. .................. 711/170; 711/171; 711/172; 711/173; 709/212; 709/213; 709/214; 709/215; 709/216; 709/217; 709/218; 709/219; 709/231; 709/232; 718/104; 707/205

(58) Field of Classification Search ........ 711/170–173; 709/212–219, 231–232; 718/104; 707/205
See application file for complete search history.

(56) References Cited

U.S. PATENT DOCUMENTS

| | | | |
|---|---|---|---|
| 5,414,455 A | 5/1995 | Hooper et al. ................. 348/7 |
| 5,550,577 A | 8/1996 | Verbiest et al. ............... 348/7 |
| 5,583,995 A * | 12/1996 | Gardner et al. ............ 709/219 |
| 5,608,448 A | 3/1997 | Smoral et al. ................ 348/7 |
| 5,805,821 A | 9/1998 | Saxena et al. ........ 395/200.61 |
| 5,828,879 A * | 10/1998 | Bennett ..................... 718/102 |
| 5,926,649 A | 7/1999 | Ma et al. ................... 395/826 |
| 5,930,473 A | 7/1999 | Teng et al. ............ 395/200.34 |
| 5,936,659 A | 8/1999 | Viswanathan et al. ........ 348/7 |
| 5,973,679 A | 10/1999 | Abbott et al. ............... 345/302 |
| 5,996,015 A | 11/1999 | Day et al. .................. 709/226 |
| 6,018,359 A | 1/2000 | Kermode et al. .............. 348/7 |
| 6,061,504 A | 5/2000 | Tzelnic et al. ......... 395/200.49 |
| 6,061,732 A * | 5/2000 | Korst et al. ................. 709/231 |
| 6,088,721 A | 7/2000 | Lin et al. .................... 709/214 |
| 6,101,546 A | 8/2000 | Hunt ......................... 709/231 |
| 6,101,547 A | 8/2000 | Mukherjee et al. ......... 709/231 |

(Continued)

OTHER PUBLICATIONS

"Performance Evaluation of Quick Video On Demand (QVOD) Server," InfoValue Computing, Inc. Technical Report IV-TR-QVOD-1999-07-1-1, Jul. 8, 1999, pp. 1-10, InfoValue Computing, Inc., Elmsford, NY, (Continued)

*Primary Examiner*—Matthew D. Anderson
*Assistant Examiner*—Hetul Patel
(74) *Attorney, Agent, or Firm*—George O. Saile; Stephen B. Ackerman; Billy Knowles

(57) ABSTRACT

A method and apparatus for dynamically balancing the loading of video data storage devices facilitates the transfer of video data by acquiring a listing of locations and loading of all segments of a requested video data. Those storage devices containing copies of each segment of the video data having a least loading are selected. If the loading of the storage devices exceed their maximum capacity, the segment is divided into sub-segments and stored to storage devices with minimum loading. The presence of all segments of the requested video data is determined. If there are missing segments of the requested video data, each of those missing segments is assigned a file identification and file location, such that those missing segments are retrieved from a back-up storage device and assigned to data storage devices having the least loading for transfer to a requesting computer system.

142 Claims, 7 Drawing Sheets

U.S. PATENT DOCUMENTS

| | | | |
|---|---|---|---|
| 6,415,328 B1 * | 7/2002 | Korst | 709/232 |
| 2002/0144283 A1 * | 10/2002 | Headings et al. | 725/109 |
| 2003/0204613 A1 * | 10/2003 | Hudson et al. | 709/231 |

OTHER PUBLICATIONS

"Network Video Computing Via Quick Video Suite", InfoValue Technical White Paper, InfoValue Computing, Inc. Elmsford NY, 1999.

"Web Distribution Systems: Caching and Replication" Chandbok, Ohio State University, 1999, found http://www.ris.ohio-state.edu/~jain/cis788-99/web-caching/index.html. Aug. 15, 2000.

"Network Caching Guide," Goulde, Patricia Seybold Group for Inktom. Corp., pp. 1-42, Boston, MA, Mar. 1999.

"Inktomi Traffic Server-Media Cache Option", Inktomi Corporation, San Mateo, CA, 1999, found http://www.inktomi.com, Aug. 15, 2000.

"Implementing Multiplexing, Streaming, and Server Interaction for MPEG-4", Kalva et al., IEEE Transactions On Circuits and Systems for Video Technology, vol. 9, No. 8 Dec. 1999, pp. 1299-1312.

"New Solution for Transparent Web Caching: Traffic Server 2.1 Supports WCCP" Inktomi Corporation, San Mateo, CA 2000, found http://www.inktomi.com,product/network/traffic/tech/wccp, Aug. 15, 2000.

"API Overview," Inktomi Corporation, San MAteo, CA, 2000, found http://www.inktomi.com/products/network/traffic/tech/wccp.

"Web Cache Communication Protocol V2", Cisco Systems, Inc., San Jose, CA, found http://cisco/univercd/cc/td/doc/product/software/ios120,120newft/120t/1203/weep.htm, Aug. 15, 2000.

"A Practical Methodology for Guaranteeing Quality of Service for Video-On Demand", Zamora et al., IEEE Transactions On Circuits and Systems for Video Technology, vol. 10, No. 1, Feb. 2000.

U.S. Appl. No. 09/748,442, filed Dec. 27, 2001, "A Video Distribution System Using Segments".

U.S. Appl. No. 09/748,304, filed Dec. 27,2001, "A Video Distribution System Using Dynamic Segmenting of Video Files".

U.S. Appl. No. 10/025,242, filed Dec. 19, 2001, "A Video Distribution System Using Disk Load Balancing by File Copying".

\* cited by examiner

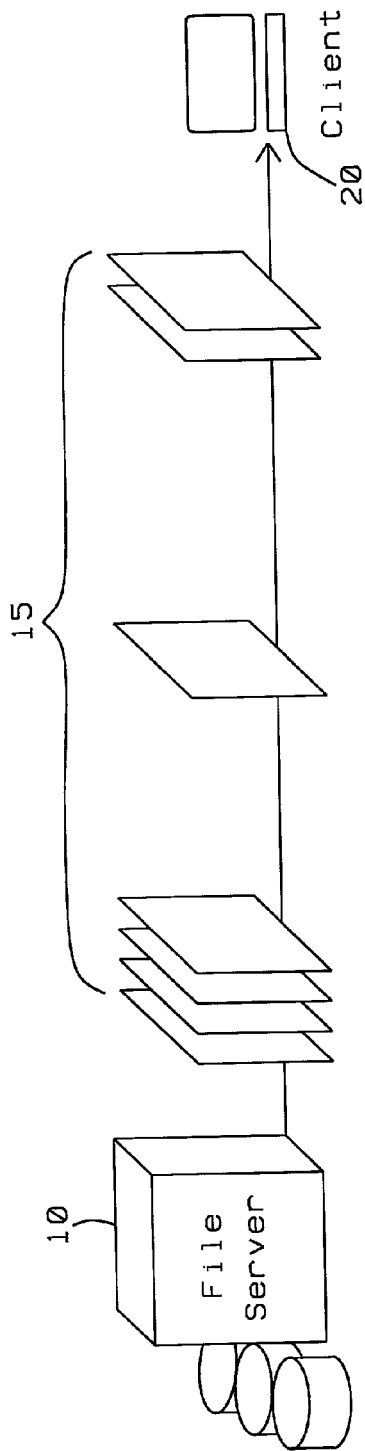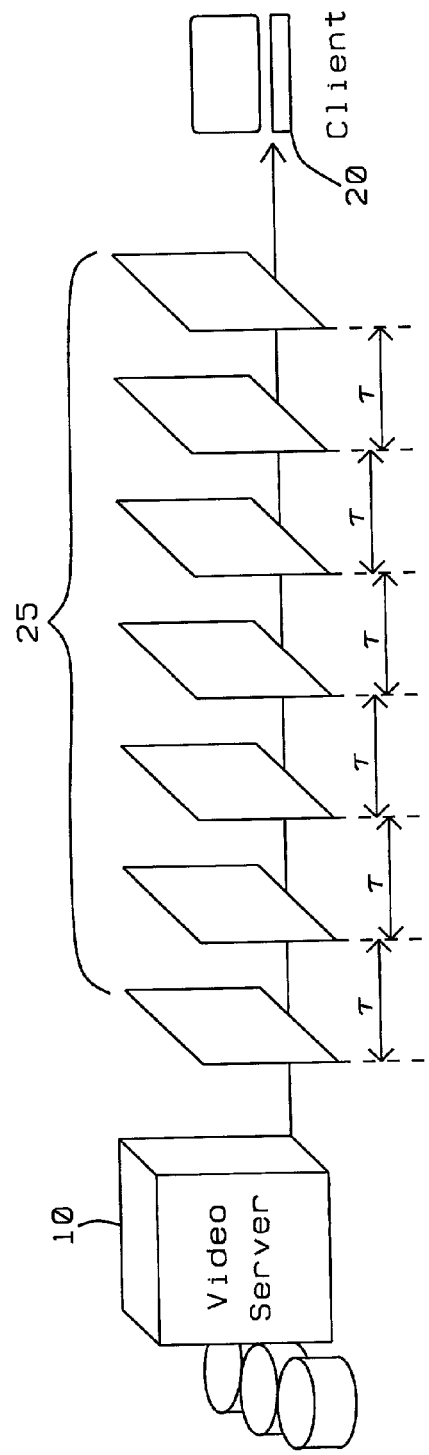
FIG. 1 — Prior Art
FIG. 2 — Prior Art

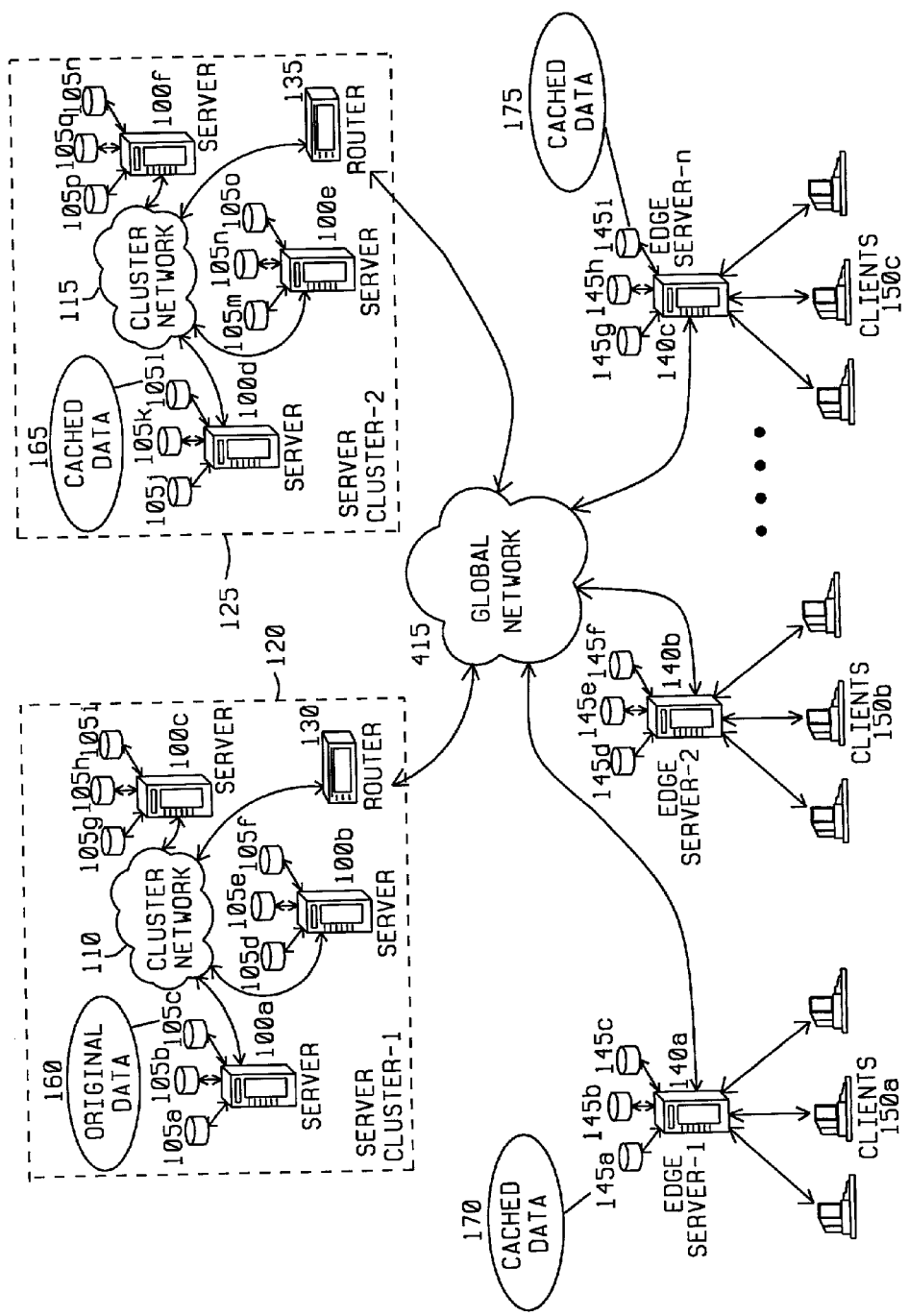
FIG. 3 – Prior Art

VIDEO DISTRIBUTION SYSTEM USING DYNAMIC DISK LOAD BALANCING WITH VARIABLE SUB-SEGMENTING

RELATED PATENT APPLICATIONS

"A Video Distribution System Using Segments," Ser. No. 09/748,442, Filing Date Dec. 27, 2001, assigned to the same assignee as this invention.

"A Video Distribution System Using Dynamic Segmenting of Video Files," Ser. No. 09/748,304, Filing Date Dec. 27, 2001, assigned to the same assignee as this invention.

"A Video Distribution System Using Disk Load Balancing by File Copying," Ser. No. 10/025,242, Filing Date Dec. 19, 2001, assigned to the same assignee as this invention.

"Streaming While Fetching Broadband Video Objects Using Heterogeneous and Dynamic Optimized Segmentation Size," Ser. No. 10/804,658, Filing Date Mar. 19, 2004, assigned to the same assignee as this invention.

"A Hardware Independent Hierarchical Cluster of Heterogeneous Media Servers Using a Hierarchical Command Beat Protocol to Synchronize Distributed Parallel Computing Systems and Employing A Virtual Dynamic Network Topology for Distributed Parallel Computing System," Ser. No. 10/804,657, Filing Date Mar. 19, 2004, assigned to the same assignee as this invention.

BACKGROUND OF THE INVENTION

1. Field of the Invention

This invention relates to the field of broadcasting quality video data over a packet switched network in such a way that the video is played in a smooth (not jerky) manner. Further, this invention relates to video distribution systems that dynamically adjust loading of storage devices such as magnetic disks by segmenting video data objects with variable segment sizes.

2. Description of Related Art

In the past video streaming servers required that a file be fully present before the sever could start streaming the file. This imposed a considerable restriction as typical DVD or broadcast quality videos may be several Gigabytes in size and thus imposed a large latency before a viewer could start viewing a video.

Video is the most dominant medium in entertainment and is rapidly becoming a critical part of computing as well. Video is often used in CD-ROM titles, for example, to mimic personal or virtual environments, increasing an application's appeal and usability. Video has a large information carrying capacity and is heavily used in capturing and conveying complicated situations such as news events, live interviews, scientific experiments, tourist attractions, and many others.

With the increasing availability of high bandwidth networks, video on-demand applications are gaining popularity on global digital communications networks such as the Internet as well as private and corporate digital communication internal networks commonly referred to as Intranets. Example applications include online training, news broadcasts, educational programming, corporate information, and virtual seminars directly to every desktop computing system or workstation. Similarly, video kiosks can be set up in enterprises and university campuses to display live video and up-to-the-minute news, without ever needing an on-site upgrade.

Video files, however, occupy huge amounts of space on computers. It requires about 10 MB to store one minute of video in most standard compression and decompression video formats, including Motion Picture Experts Group standard MPEG-1, the Apple Computer Inc. Indio, Intel Corp. QuickTime, and Super Mac, Inc Cinema. That translates into 1.2 GB of space for two hours of video, the length of an average feature film. These tremendous storage requirements make effective on-demand sharing of video files at least as important as conventional file sharing.

However, conventional file servers do not address video's unique requirements and cannot effectively support video sharing. Full-motion video, inherited from analog TV, is a sequence of images played out at constant intervals. The two most common analog video formats are the National Television Standards Committee (NTSC), used in the United States and Japan, and Phase Alternation Standard (PAL), used in Europe. NTSC plays video at 30 frames per second, while PAL plays it at 25 frames per second. The sequence of images in a video clip must be relayed at a constant interval, or else the perceptual quality degrades rapidly: the motion jumps and the sound breaks. This rigid periodic timing property is referred to as the isochronous requirement. Referring now to FIG. 1, conventional file servers 10 are designed for minimal transfer latency. Files 15 are thus transferred to maintain the minimum latency and are transferred as quickly as possible. The files 15 will be interleaved with other digital communication traffic on the network and thus non-isochronously. Without explicit mechanisms to ensure isochronism, delivery rates are irregular, resulting in erratic playback quality at the client computing system 20.

To avoid erratic playback, the usual approach is to download whole files 15 from the server 10 to the client computing system 20 before starting video playback. This approach results in unacceptable delays for most video files, which are large. For example, even with transfer rates as fast as 1.5 Mb/second, the initial start-up delay is 60 seconds for a one minute video clip.

It is thus desirable to deliver video streams isochronously, as depicted in FIG. 2, so that video playback is guaranteed to have smooth motion and sound. The file server 10 must now transfer or stream the files 25 such that the time between each section of the file is transferred at a period of time $\tau$. The even interval allows the file 25 to arrive isochronously with the first section to be displayed before any of the remaining sections of the file 25 have arrived at the client system 25. This allows a video clip to begin practically instantaneously.

The rapid advances in the speeds of microprocessors, storage, and network hardware may give a false impression that video on-demand (VOD) solutions do not need special purpose video streaming software. Video streaming as shown in FIG. 2 allows efficient playback of full motion videos over networks with guaranteed quality using isochronous timing.

When an operating system's default file transfer mode is used to stream a video file, faster hardware may accelerate the operating system's transfer rate, but this improved hardware still cannot change the fundamental, erratic behavior of a file transfer as shown in FIG. 1. By default, the file transfer process does not respect the isochronous nature of a video stream. This typically results in a jerky and poor-quality playback of a video stream. The dominant factors of a system's overall streaming performance are the higher level client/server and networking processes, and are not the raw power of the low level physical devices.

When an application at a Windows client accesses a file in a Windows NT server, the data is automatically cached by WFS at both Windows client and Windows NT server. This is a commonly used technique for reducing the amount of disk access when the cached data can be reused by subsequent requests. This technique does not work for most video-on-demand applications for two reasons. The first reason is that the cached data is hardly used again. VOD applications have very low "locality profile" because they tend to have high data rate and massive volume of videos for users' interactive playback. The second reason is that the constant video caching leads to intensive memory paging and, thus, severally limits performance.

U.S. Pat. No. 6,101,546 (Hunt) describes a method and system for providing data files that are partitioned by delivery time and data type. A file is logically partitioned into data channels where each data channels holds a sequence of data of a particular data type. The data channels are logically partitioned into delivery times. The format of the file explicitly sets forth the synchronization between the data channels and the delivery times of data held within the channels. The file format is especially well adapted for use in a distributed environment in which the file is to be transferred from a server to a client. Channel handlers are provided at the client to process respective data channels in the file. The channel handlers are data type specific in that they are constructed to process data of an associated data type. The data in the file may be rendered independently of the delivery time of the data.

U.S. Pat. No. 6,018,359 (Kermode, et al.) illustrates a system and method for multicast video-on-demand delivery system. The video-on-demand system divides video files into sequentially organized data segments for transmission and playback. Each segment is repeatedly transmitted in a looping fashion over a transmission channel. The rate of transmission is equal to or greater than the playback rate, and the lengths of the segments are chosen such that:

1. the receiver tunes into no more than a fixed number of channels (preferably two) at any one time;
2. the receiver tunes into a new channel only after an entire segment has been received from a previous channel; and
3. until a maximum segment length is attained, data is received from no fewer than two channels.

The segments are sequentially presented even as new segments are being downloaded. When the display rate is equal to the transmission rate, it is found that the foregoing conditions are satisfied when the relative lengths of the segments form a modified Fibonacci sequence.

U.S. Pat. No. 5,930,473 (Teng, et al.) discloses a video application server for mediating live video services. The video application server is to be used in a network including source clients and viewer clients connected to one or more shared transmission media. A video server is connected to one of the transmission media and is operative to control the broadcast and storage of multiple live or previously-stored video streams. The control may be provided via remote procedure call (RPC) commands transmitted between the server and the clients. In one embodiment, a video presentation system is provided in which a video stream from a source client is continuously broadcast to a number of viewer clients. One or more of the viewer clients may be authorized by the source client to broadcast an audio and/or video stream to the other clients receiving the source video stream. In another embodiment, a multicast directory is provided to each of a plurality of viewer clients by transmitting directory information in a packet corresponding to a predetermined multicast address. The multicast directory indicates to a particular viewer client which of a number of video programs are available for broadcast to that client.

U.S. Pat. No. 6,101,547 (Mukherjee, et al.) describes an inexpensive, scalable and open-architecture media server. The multi-media server provides client systems with streaming data requiring soft real-time guarantee and static data requiring a large amount of storage space. The servers use a pull-mode protocol to communicate with client systems through a real-time network. Separate data and control channels enhance the soft real-time capability of the server. The data channel conforms to an open standard protocol such as such as Transmission Control Protocol (TCP), User Datagram Protocol (UDP), or Real-time Transport Protocol (RTP). A switched data link layer for the control channel permits separate intrahost control messages that may be multicast and broadcast. The distributed file system selects a specific data block size based upon the compression technique employed to enhance soft real-time guarantee. A hierarchical data structure combined with merging empty data blocks minimizes disk fragmentation. Data blocks are striped across multiple disks to improve disk utilization. A local buffer and a queue for both read and write requests provides support for simultaneous read and write data streams.

U.S. Pat. No. 5,805,821 (Saxena, et al.) teaches a video optimized media streamer user interface employing non-blocking switching to achieve isochronous data transfers. The media streamer includes at least one control node; a user interface having an output coupled to the at least one control node; at least one storage node for storing a digital representation of at least one video presentation; and a plurality of communication nodes each having an input port for receiving a digital representation of at least one video presentation therefrom. The video presentation requires a time T to present in its entirety, and is stored as a plurality of N data blocks. Each data block stores data corresponding to a T/N period of the video presentation. Each communication nodes further has a plurality of output ports for outputting a digital representation. A circuit switch is connected between the at least one storage node and the input ports of communication nodes for coupling one or more input ports to the at least one storage node. The user interface includes a capability for specifying commands for execution, and the at least one control node is responsive to individual ones of the commands for controlling at least one of the at least one storage node and at least one of the plurality of communication nodes, in cooperation with the circuit switch, so as to execute a function associated with individual ones of the commands. The commands may include video cassette recorder-like commands that include commands selected from a group that includes a Load command, an Eject command, a Play command, a Slow command, a Fast Forward command, a Pause command, a Stop command, a Rewind command, and a Mute command. The commands may also include commands selected from a group that includes a Play List command, a Play Length command, and a Batch command. A synchronous application program interface (API) is provided for coupling, via the user interface, a user application program to the at least one control node. The API includes Remote Procedure Call (RPC) procedures.

U.S. Pat. No. 5,550,577 (Verbiest, et al.) illustrates a video on demand network, including a central video server and distributed video servers with random access read/write memories. The video on demand network transmits video signals to user stations pursuant to the receipt of control signals issued by these user stations. In order to optimize the retrieval costs, this video on demand network maintains a large video library in a central video server and stores locally popular video signals in a plurality of local distributed video servers from which the latter video signals are transmitted to the user stations. The video signals provided by the local distributed servers are updated from the central server based upon the changing popularity of the video signals. The video on demand network of Verbiest proposes in particular to store the video signals in the local distributed servers in random access read/write memories, e.g., electronic RAMs, magnetic or optical disks from which the video signals can flexibly be supplied on-line to the user stations and to store the video signals in the central server in sequential access memories, e.g. Digital Audio Tapes (DAT) and CD-ROMs (CDR), providing cheap mass storage.

"Performance Evaluation of QuickVideo OnDemand (QVOD) Server," InfoValue Computing, Inc. Technical Report IV-TR-QVOD-1999-07-1-1, Jul. 8, 1999, InfoValue Computing, Inc., Elmsford, N.Y. describes a video on-demand system developed for high performance, effective and flexible, network-based, on-demand sharing of videos. QuickVideo On Demand provides streaming throughput for broadband applications Further, QuickVideo On Demand allows a linearly scalable clustering mechanism which provides support for higher throughputs, if required. QuickVideo On Demand supports all video formats, codecs, networks and applications, and is compatible with any open application platform.

"Network Video Computing Via QuickVideo Suite," InfoValue Technical White Paper, InfoValue Computing, Inc., Elmsford, N.Y., 1999, describes Network Video Computing the core of which is video streaming. Video streaming allows the efficient playing of full-motion video content over networks with guaranteed quality. The rigid timing property of full motion video is referred to as the isochronous timing. File servers are designed to minimize transfer latency during conventional network transfers, and are insensitive to video's unique timing requirement. As a result, delivery rates are irregular and produce erratic playback as described above. Video streaming technologies are real-time network transfers that maintain the video's critical timing property throughout the entire delivery period, as depicted in FIG. 2. This white paper describes the an open architecture with a streaming core.

"Web Distribution Systems: Caching and Replication" Chandbok, Ohio State University, 1999, found http://www.cis.ohio-state.edu/~jain/cis788-99/web_caching/index.html, Aug. 15, 2000, provides an overview of the current techniques for caching and replication of digital data on computer systems interconnected through a global or local digital communication network. Refer now to FIG. 3 for a summary of caching in large distributed digital processing networks. Multiple server computing systems 100a, 100b, . . . , 100f are high performance computing systems such as the IBM Corporation RS-6000-SP, The Sun Microsystems, Inc. Enterprise 10000 Server, the Hewlett-Packard Netserver AA-6200, or other server systems The computer systems 100a, 100b, . . . , 100f are each connected to multiple storage devices 105a, 105b, . . . , 105r. The storage devices 105a, 105b, . . . , 105r are magnetic disk devices, compact disk read only memory (CD-ROM) "juke boxes," or tapes drives. A group of the server systems 100a, 100b, 100c or 100d, 100e, 101f are respectively interconnected through the digital communications cluster network 110 and 115 to form the server cluster 1 120 and the server cluster 2 125. The server cluster 1 120 and the server cluster 2 125 may be resident with in the same enterprise data center or placed at different geographical locations either within the enterprises or even in different enterprises.

The cluster networks 110 and 115 are connected respectively to the network routers 130 and 135. The network routers 130 and 135 are further connected to a public or global digital communications network 155. The global network 155 may be the public Internet or an enterprise's private Intranet.

The server computer systems 100a, 100b, . . . , 100f contain database information systems, storage for files such as audio or video files, and other data files to accessed by large numbers of people either publicly or privately within an enterprise through the client systems 150a, 150b, 150c.

Edge servers 140a, 140b, 140c are connected to the global network 155 and thus provide access portals for the client systems 150a, 150b, 150c to the global network 155 to communicate with each other, with other edge servers 140a, 140b, 140c, or with the server computer systems 100a, 100b, . . . , 100f. Each edge servers 140a, 140b, 140c is connected has attached data storage device 145a, 145b, . . . , 145i. The attached data storage device 145a, 145b, . . . , 145i is generally a magnetic disk storage device, but may also include a CD-ROM, magnetic tape, or other storage media.

If a server computer systems 100a, 100b, . . . , 100f has data 160 that is requested by many of the client systems 150a, 150b, 150c, the network traffic to the server computer system 100a may to great for either the global network 155 or the cluster network 110 to carry and maintain a reasonable quality of service. Quality of service in this context means that the original data 160 is transferred repetitively relatively quickly an if the original data 160 is audio or video files, that the isochronous nature of the transfer of the data is maintained.

If the server clusters 120 and 125 are separated geographically, it may cost less to maintain the quality of service by placing a copy 165 of the original data 160 in a disk 105l on a second server system 100d. If the copy 165 of the original data 160 is permanent, it is referred to as being replicated. If the copy 165 of the original data 160 is temporary it is referred to as cached As the demand for the original data 160 is increased, it may be desirable to either replicate or cache 170 or 175 the data even within the disks 145b or 145i of the edge servers 150a or 150c.

There are many policies developed regarding which of the original data 160 is replicated or cached 165, 170, or 175. Further, the replacement of cached data 165, 170, or 175 by other data that is demanded more often is known and generally follows a least recently used protocol, where the cached data 165, 170, or 175 that has not been requested is replaced by that is more requested.

U.S. Pat. No. 6,088,721 (Lin, et al.) teaches an efficient unified replication and caching protocol. The protocol provides assurance of consistent replication of objects from a central server to caching servers, for example, over data communication networks such as the Internet. It is an application-layer protocol, which guarantees delivery of objects such as files. This protocol insures that objects sent by a source machine such as a server to any number of destination machines such as caching servers actually arrive at the intended caching servers even when the caching servers are temporarily unavailable, for example, due to failure or network partition.

U.S. Pat. No. 6,061,504 (Tzelnic, et al.) illustrates a video file server using an integrated cached disk array and stream server computers. The video file server includes an integrated cached disk array storage subsystem and a multiple stream server computers linking the cached disk storage system to the data network for the transfer of video data streams. The video file server further includes a controller server for applying an admission control policy to client requests and assigning stream servers to service the client requests. The stream servers include a real-time scheduler for scheduling isochronous tasks, and supports at least one industry standard network file access protocol such as Simple Network Management Protocol (SNMP) and one file access protocol Network File System (NFS) for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video file server provides video-on-demand service by maintaining and dynamically allocating sliding windows of video data in the random access memories of the stream server computers.

"Network Caching Guide," Goulde, Patricia Seybold Group for Inktomi Corp., Boston, Mass., March 1999, describes the various types of caching approaches and the different ways for caches to be implemented. Implementations vary depending on where the cache is placed, who is accessing the cache, and the quantity and type of content that is being cached. Goulde describes the Inktomi Traffic Server from Inktomi Corporation The Inktomi Traffic Server is capable of delivering fresh content to large numbers of users around the world from a large number of Web servers around the world.

"Inktomi Traffic Server—Media Cache Option", Inktomi Corporation, San Mateo Calif., 1999, found http://www.inktomi.com, Aug. 15, 2000, describes the caching option for the Inktomi Traffic Server to support streaming of video data files.

"Implementing Multiplexing, Streaming, and Server Interaction for MPEG-4" Kalva et al., IEEE Transactions On Circuits And Systems For Video Technology, Vol. 9, No. 8, December 1999, pp. 1299–1312, describes the implementation of a streaming client-server system for object-based audio-visual presentations in general and MPEG-4 content in particular. The system augments the MPEG-4 demonstration software implementation (IM1) for PC's by adding network-based operation with full support for the Delivery Multimedia Integration Framework (DMIF) specification, a streaming PC-based server with DMIF support, and multiplexing software. The MPEG-4 server is designed for delivering object-based audio-visual presentations. The system also implements an architecture for client-server interaction in object-based audio-visual presentations, using the mechanism of command routes and command descriptors.

"New Solution for Transparent Web Caching: Traffic Server 2.1 Supports WCCP," Inktomi Corporation, San Mateo Calif., 2000, found http://www.inktomi.com/products/network/traffic/tech/wccp, Aug. 15, 2000 describes the use of the Web Cache Control Protocol (WCCP) from Cisco Systems, Inc. within Inktomi Corporation's Traffic Server.

"API Overview," Inktomi Corporation, San Mateo Calif., 2000, found http://www.inktomi.com/products/network/traffic/tech/wccp, Aug. 15, 2000, describes the application program interface tools that are available for the Inktomi Corporation's Traffic Server which allow customization or the Traffic Server's event processing thus allowing manipulation of hypertext transaction protocol (HTTP) transactions at any point in their lifetime.

"Web Cache Communication Protocol v2" Cisco Systems, Inc., San Jose, Calif., found http://www.cisco.com/univercd/cc/td/doc/product/software/ios120/120newft/120t/120t3/wccp.htm, Aug. 15, 2000, describes the protocol that allows the use a Cisco Cache Engine to handle web traffic, reducing transmission costs and downloading time. This traffic includes user requests to view pages and graphics on World Wide Web servers, whether internal or external to a network, and the replies to those requests When a user requests a page from a web server (located in the Internet), the router sends the request to a cache engine. If the cache engine has a copy of the requested page in storage, the cache engine sends the user that page. Otherwise, the cache engine retrieves the requested page and the objects on that page from the web server, stores a copy of the page and its objects, and forwards the page and objects to the user. WCCP transparently redirects Hypertext Transfer Protocol (HTTP) requests from the intended server to a cache engine.

"A Practical Methodology For Guaranteeing Quality Of Service For Video-On-Demand," Zamora et al., IEEE Transactions On Circuits And Systems For Video Technology, Vol. 10, No. 1, February 2000, describes an approach for defining end-to-end quality of service (QoS) in video-on-demand (VoD) services. A schedulable region for a video server, which guarantees end-to-end QoS, where a specific QoS required in the video client, translates into a QoS specification for the video server. The methodology is based on a generic model for VoD services, which is extendible to any VoD system. In this kind of system, both the network and the video server are potential sources of QoS degradation. The effects that impairments in the video server and video client have on the video quality perceived by the end user is examined.

As described above, video files may be very large, on the order of 1.2 GB for a two hour movie or video presentation. In the digital communication networks 110, 115, and 155 of FIG. 3, the files are generally formed into data packets for transfer. These data packets may not arrive to a designated client system 150*a*, 150*b*, 150*c* in correct order for processing. This requires reception of the complete file before processing may begin. If the file is an audio or video file requiring isochronous presentation of the file, the files must be totally received before processing or the files must be segmented or partitioned into portions to allow smaller units of the files to be processed.

U.S. Pat. No. 5,926,649 (Ma, et al.) teaches a Media server for storage and retrieval of voluminous multimedia data. The Media server provides storage and retrieval of multiple data streams in a multimedia distribution system. A given data stream is separated into a plurality of portions, and the portions are stored in a multi-disk storage system with Y disks each having X zones such that the ith portion of the given stream is stored in zone (i mod X) of disk (i mod Y). The number X of zones per disk and the number Y of disks are selected as relatively prime numbers. The stored data are retrieved using Y independent retrieval schedulers, which are circulated among the Y disks over a number of scheduling intervals. Each retrieval scheduler processes multiple requests separated into X groups, with the requests of each group accessing the same disk zone during a given scheduling interval. The retrieval schedulers are also configured such that the retrieval requests of a given retrieval scheduler access the same disk during a given scheduling interval. The data stream placement technique in conjunction with the retrieval schedulers provide sequential-like parallel retrieval suitable for supporting real-time multimedia data distribution for large numbers of clients.

U.S. Pat. No. 5,936,659 (Viswanathan, et al.) illustrates a method for broadcasting movies within channels of a wide band network by breaking the communications path into a number of logical channels and breaking each movie up into a number of segments of increasing size. The first segment of each movie is the smallest segment is transmitted in sequence over the first logical channel and repeated. The second segment of each movie, which is proportionately larger than the first segment of each movie, is transmitted in sequence over the second logical channel and repeated. This is repeated for the total number of segments, which equals the total number of logical channels. The segments are broadcast in such a way that, once the first segment is received at a client location, the subsequent segments are also received in time, so that the movie can be viewed continuously.

U.S. Pat. No. 5,973,679 (Abbott, et al.) describes an indexing method for allowing a viewer to control the mode of delivery of program material. By mapping from time to data position, data delivery can begin at any selected time in the program material. The indexing method also provides for controlling data delivery to begin at the beginning of a frame of data. A synchronizing method is provided to minimize a time offset between audio and video data, particularly in environments using groups of pictures.

U.S. Pat. No. 5,996,015 (Day, et al.) describes a method of delivering seamless and continuous presentation of multimedia data files to a target device by assembling and concatenating multimedia segments in memory. The provides a multimedia server connected in a network configuration with client computer systems. The multimedia server further includes various functional units which are selectively operable for delivering and effecting the presentation of multimedia files to the client such that a plurality of multimedia files are seamlessly concatenated on the fly to enable a continuous and uninterrupted presentation to the client. In one example, client selected video files are seamlessly joined together at the server just prior to file delivery from the server. The methodology includes the analog to digital encoding of multimedia segments followed by a commonization processing to ensure that all of the multimedia segments have common operating characteristics. A seamless sequential playlist or dynamically created playlist is assembled from the selected and commonized segments and the resources needed to deliver and play the playlist are reserved in advance to assure resource availability for continuous transmission and execution of the playlist. At a predetermined point prior to an end point of each selected multimedia segment, the next selected segment is initialized and aligned in memory in preparation for a seamless switch to the next segment at the end of a previous segment, thereby providing a seamless flow of data and a continuous presentation of a plurality of selected multimedia files to a client system.

U.S. Pat. No. 5,608,448 (Smoral, et al.) describes a hybrid architecture for a video on demand server. The processing requirement at each computing element in a video server for a video on demand (VOD) system is reduced to only those needed for VOD, resulting in a less expensive processor with less memory and, hence, lower cost. A hybrid video server architecture combines the features of massive parallel processor (MPP) and workstation designs. Since it is not necessary to run a parallel relational database program in order to accomplish VOD data distribution, a unique type of switch element that is well matched to the VOD server problem is employed. By matching this switch element technology to an appropriate data storage technique, a full featured, responsive VOD server is realized.

U.S. Pat. No. 6,061,732 (Korst, et al.) describes a data streaming system utilizing an asynchronous technique for retrieving data from a stream server. In an audio/video server blocks of data are read from a storage medium by a reader and supplied to users in the form of data streams. The storage medium comprises a plurality of record-carrier based storage units. A reader reads a batch of data units from a storage unit in a single relative movement of a reading head of the storage unit with respect to the record-carrier of the storage unit. A scheduler controls reading of blocks from the storage medium by determining from which storage unit(s) data unit(s) need to be read for the block and placing a corresponding carrier access request in a read queue. The scheduler extracts for each of the storage units a batch of carrier access requests from the queue and issues the batch to the reader in an asynchronous manner, in response to the reader having substantially completed reading data units for a previous batch for the storage unit.

U.S. Pat. No. 5,414,455 (Hooper, et al.) teaches a segmented video on demand system. In the system for distributing videos, multiple videos are stored on a mass storage device. Each video includes a plurality of frames of digitized video data for play-back on a viewing device. The system includes a memory buffer for storing a segment of a selected one of the videos. The segment includes a predetermined number of frames representing a predetermined time interval of the selected video. In addition, the memory buffer including a write pointer and a read pointer. Software controlled servers are provided for witting and reading video data of the selected video to and from the memory buffer, independently, at locations indicated by the write and read pointers to transfer the selected video to the viewing device.

When any of the multiple client systems 150*a*, 150*b*, and 150*c* requests access to the original data 160 present, each request is fulfilled and the original data is routed through the server computing system 100*a*, the cluster network 110, the router 130, to the global digital communications network 155, to the edge servers 140*a*, 140*b*, 140*c* to the requesting client systems 150*a*, 150*b*, and 150*c*. Each transfer of the original data 160 consumes a portion of the available transfer rate (Bytes/sec) or bandwidth of the connections from the storage device 105*a* to the server computing system 100*a*, from the server computing system 100*a* to the cluster network 110, from the cluster network 110 to the router 130, from the router 130 to the global digital communication network 155, from the global communications network 155 to the edge servers 140*a*, 140*b*, 140*c*, from the edge servers 140*a*, 140*b*, 140*c* to the requesting client systems 150*a*, 150*b*, and 150*c*. The smallest bandwidth of this chain is generally the determining factor of the loading. In this case the loading determinant will be from the storage device 105*a* to the server computing system 100*a*. If there are no copies of the original data 160, as the number of requests for the original data increases, the available bandwidth decrease or loading on the storage device 105*a* increases. The loading of the data transfer 160 to and from the data storage device 105*a* must be in balance or the requests for the transfer may not be honored. In the case of video-on-demand, this cause interruptions or at least degradation of the quality of service in viewing the demanded video.

"DASD Dancing: A Disk Load Balancing Optimization Scheme for Video-on-Demand Computer," Wolf, et al., ACM SIGMETRICS 1995, pp. 157–166 proposes a scheme to dynamically perform load-balancing of DASDs: (direct access storage devices), which is referred to as a DASD dancing algorithm. The algorithm consists of two components. The static component assigns movie files to DSGs (disk-striping groups) initially, and it also reassigns movies periodically, for example every day or every week. The dynamic component performs the real-time movie stream scheduling. (A disk-striping group, or DSG, is a group of disks, which contains a number of movies).

"Load Balancing For a Video-On-Demand Server," DO, Information and Computer Science Dept, University of California, Irvine, 1998, found Oct. 1, 2000, http://www.ics.uci.edu/~tdo/loadVOD/loadVOD.html, is an overview of the state of the art of load balancing for video-on-demand server systems, the problems that are involved with the server systems, and solutions for those problems.

"Random Duplicated Assignment: An Alternative to Striping in Video Servers," Korst, Electronic Proceedings ACM Multimedia 97, November 1997, found http://info.acm.org/sigmm/MM97/Papers/korst/RDA.html, Oct. 2, 2000, describes an approach for storing video data in large disk arrays Video data is stored by assigning a number of copies of each data block to different, randomly chosen disks, where the number of copies may depend on the popularity of the corresponding video data. The use of the approach results in smaller response times and lower disk and RAM costs if many continuous variable-rate data streams have to be sustained simultaneously.

U.S. Pat. No. 5,544,313 (Shachnai, et al.) describes a baton passing optimization scheme for load balancing/configuration planning in a video-on-demand computer system. A video on demand computer system includes multiple storage devises each storing many video data files. The storage devices in this case are disks attached to a computer system. The computer system plays the videos on demand by reading out the videos from the disks as data streams to play selected video data files in response to user requests. The computer system is programmed to monitor the numbers of video data files being performed for each of the disks. Based on the monitoring function performed by the computer system, the computer system performs a load balancing function by transferring the current transfer of a video data file in progress from the disk having the original video data file being transferred to another disk having a copy of the video data file. The computer system periodically performs a reassignment function to transfer videos between the disks to optimize load balancing based on the user performance requests for each of the video data files. There are two phases to the load balancing performed by the computer system; a static phase and a dynamic phase. In the static phase, video data files are assigned to memory and disks, and in the dynamic phase there is provided a scheme for playing video data files with minimal and balanced loads on the disks. The static phase supports the dynamic phase, which insures optimal real-time operation of the system. Dynamic phase load balancing is accomplished by a process of "baton passing".

"U.S. Pat. No. 5,333,315 (Saether, et al.) describe a computer system of device independent file directories using a tag between the directories and file descriptors that migrate with the files. The computer file system has a multiple disk storage devices which includes a multiple of file directories, stored on various disks. Each file directory is used to translate file names into corresponding tag values. For each disk there is a file descriptor table with a file descriptor entry for every file stored on the disk. A single tag directory contains one tag entry for every file stored in the system. The tag directory is used by the file system to find a file by translating a tag value into a pointer to the disk on which the file is stored and a pointer to the file's file descriptor entry. To move a file from a first disk to a second disk, the file is copied to the second disk, a new file descriptor entry for the copied file is generated in the file descriptor table for the second disk, the copy of the file on the first disk is de-allocated, and the tag entry for the file is updated to point to the second disk and to the file's new file descriptor entry. Thus, a file can be moved from a first disk a second without having to locate and update all the corresponding file directory entries. In a preferred embodiment, the file system includes a routine that monitors disk loading and unused disk capacity. It determines when disk usage is imbalanced and automatically moves files among the disks so as to better balance disk usage.

U.S. Pat. No. 5,631,694 (Aggarwal, et al.) describes a maximum factor selection policy for batching VOD requests. A VOD scheduler maintains a queue of pending performance for each video. Using the notion of queue selection factor, a batching policy is devised that schedules the video with the highest selection factor. Selection factors are obtained by applying discriminatory weighting factors to the adjusted queue lengths associated with each video where the weight decreases as the popularity of the respective video increases and the queue length is adjusted to take defection into account.

SUMMARY OF THE INVENTION

An object of this invention is to provide a method and apparatus to dynamically balance the loading of data storage facilities containing video data files.

Further, another object of this invention is to provide a method and apparatus to balance the loading of data storage facilities containing video data files to facilitate the transfer of the video data files or portions of video data files from a file server system to client computing system.

To accomplish at least one of these and other objects, a method for balancing a loading of a storage device attached to multiple computing systems begins by acquiring a listing of locations of all segments of a requested data object including all copies of the segments of the requested data object. The presence of all segments of the requested data object is determined. If there are missing segments of the requested data object, each of those missing segments is assigned a file identification and file location, such that those missing segments are assigned to data storage devices having the least loading. The missing segments are retrieved from a back-up storage device.

The loading of the storage containing all copies of all segments of a requested data object is evaluated and those storage devices containing copies of each segment of the data object having a least loading, which is less than a maximum loading for the storage devices, is selected. If the loading of the storage devices is greater than the maximum loading for the storage devices, the requested segment is divided into sub-segments and the sub-segments of the requested segment are copied to the storage devices having the least loading. The segments of the requested data object are then transferred to a requesting computer system.

To select the storage devices containing copies of the segments of the requested data object and having the least loading, a current segment indicator is first set to indicate which of the segments of the data object is to be transferred next. Then a current storage device indicator is set to specify a primary location of the segment to be transferred next. If the transfer of the segment causes the loading of the storage device containing the segment to be exceeded, the current storage device indicator is incremented to a next location of the segment to be transferred. If the loading for each storage device containing a copy of the segment of the data exceeds the maximum loading, the next copy is examined until one of the storage devices does not have excess loading. If all copies of the segment exceed the loading, the segment is further segmented and the sub-segments transferred to a storage device having light loading.

The sub-segmentation of the current segment begins with creating the sub-segment size list for the requested segment by first determining a number of storage devices available to retain the sub-segments of the data file. A maximum data transfer load for the storage devices is then determined. A minimum sub-segment size, which is the smallest amount of data to be contained within one sub-segment of the data file, is then assigned. A first sub-segment size is calculated as a first function of a number of the storage devices, the current data transfer load, the maximum data transfer load, and the minimum sub-segment size. The size of a last sub-segment is assigned as the minimum sub-segment size. The remaining sub-segment sizes are calculated as a second function of the number of the storage devices, the current data transfer load, the maximum data transfer load, and the minimum sub-segment size. The current requested segment is then partitioned into sub-segments such that the first sub-segment of the requested segment is of the first sub-segment size, the last sub-segment of the data file is of the last sub-segment size, and all the remaining sub-segments of the data file is of the remaining sub-segment sizes. Once the requested segment has been sub-segmented, the storage device that is to retain each sub-segment of the data file is assigned and the address within the storage devices to identify the location of an assigned sub-segment is assigned. Further, a name for each sub-segment of the current requested segment is generated.

The first function to determine the first sub-segment size is found by the formula:

$$SubSeg1 = \min(SubSegSize_{min}, V/f)$$

where
SubSeg1 is the first sub-segment size,
min is the minimum function of two variables,
SubSegSize$_{min}$ is the minimum sub-segment size allowed during the fragmenting of the video data file. The minimum sub-segment size is empirically determined and is usually about 5 second of the playing time of the video data file.
V is a total size of a segment of the digital data file, and f is determined by the formula:

$$f = N_d + (M_I/M_I - C_I)$$

where
$N_d$ is the number of storage devices available to retain the sub-segments of the segments of the digital data file,
$M_I$ is the maximum digital data transfer load for the data storage devices, and
$C_I$ is the current digital data transfer load of the data storage devices.

The second function to determine the remaining sub-segment sizes is found by the formula:

$$SubSegn = \max(SubSegSize_{min}, V/f)$$

where
SubSegn is the a sub-segment size for one sub-segment of the remaining sub-segments,
max is the maximum function of two variables,
SubSegSize$_{min}$ is the minimum sub-segment size allowed during the fragmenting of the data file,
V is a total size of a segment of the digital data file, and f is determined by the formula:

$$f = N_d + (M_I/M_I - C_I)$$

where
$N_d$ is the number of storage devices available to retain the sub-segments of the segments of the digital data file,
$M_I$ is the maximum digital data transfer load, and
$C_I$ is the current digital data transfer load, The sub-segmentation process further determines a file usage factor describing a number of requests for the data file for a period of time and a file interactivity factor describing a number of jumps by the computing system within the data file. The first and second functions are dependent upon the file usage factor and/or the file interactivity factor. The first function to determine the first sub-segment size is now found by the formula:

$$SubSeg1 = \min(SubSegSize_{min}, V/f)$$

where
SubSeg1 is the first sub-segment size,
min is the minimum function of two variables,
SubSegSize$_{min}$ is the minimum sub-segment size allowed during the fragmenting of the video data file,
V is a total size of a segment of the digital data file, and f is determined by the formula:

$$f = N_d + (M_I/M_I - C_I) + H + I$$

where
$N_d$ is the number of storage devices available to retain the sub-segments of the segments of the digital data file,
$M_I$ is the maximum digital data transfer load,
$C_I$ is the current digital data transfer load,
H is the file usage factor, and
I is the file Interactivity factor.

The second function to determine the remaining sub-segment sizes is found by the formula $$SubSegn = \max(SubSegSize_{min}, V/f)$$

where
SubSegn is the a sub-segment size for one sub-segment of the remaining sub-segments,
max is the maximum function of two variables,
SubSegSize$_{min}$ is the minimum sub-segment size allowed during the fragmenting of the video data file,
V is a total size of a segment of the digital data file, and f is determined by the formula:

$$f = N_d + (M_I/M_I - C_I) + H + I$$

where
$N_d$ is the number of storage devices available to retain the sub-segments of the segments of the digital data file,
$M_I$ is the maximum digital data transfer load,
$C_I$ is the current digital data transfer load,
H is the file usage factor, and
I is the file Interactivity factor.

The transfer of the segments of the data object is defined as reading the segments from the data storage device, writing the segments to the data storage device, and copying the segments from a the data storage device to an alternate data storage device. The loading of the data storage device is allocated between the reading, writing, and copying of the segments to prevent interference with the reading of the segments.

The data objects as described for this invention are video data files to be streamed isochronously to the requesting computer system.

BRIEF DESCRIPTION OF THE DRAWINGS

FIG. 1 is a diagram of the transfer of files on a digital communications network of the prior art requiring minimal latency.

FIG. 2 is a diagram of the transfer of files on digital communications network of the prior art illustrating isochronous file transfer.

FIG. 3 is a diagram of a distributed computer network system illustrating replication of files in caches of the prior art.

DETAILED DESCRIPTION OF THE INVENTION

Figure 4:
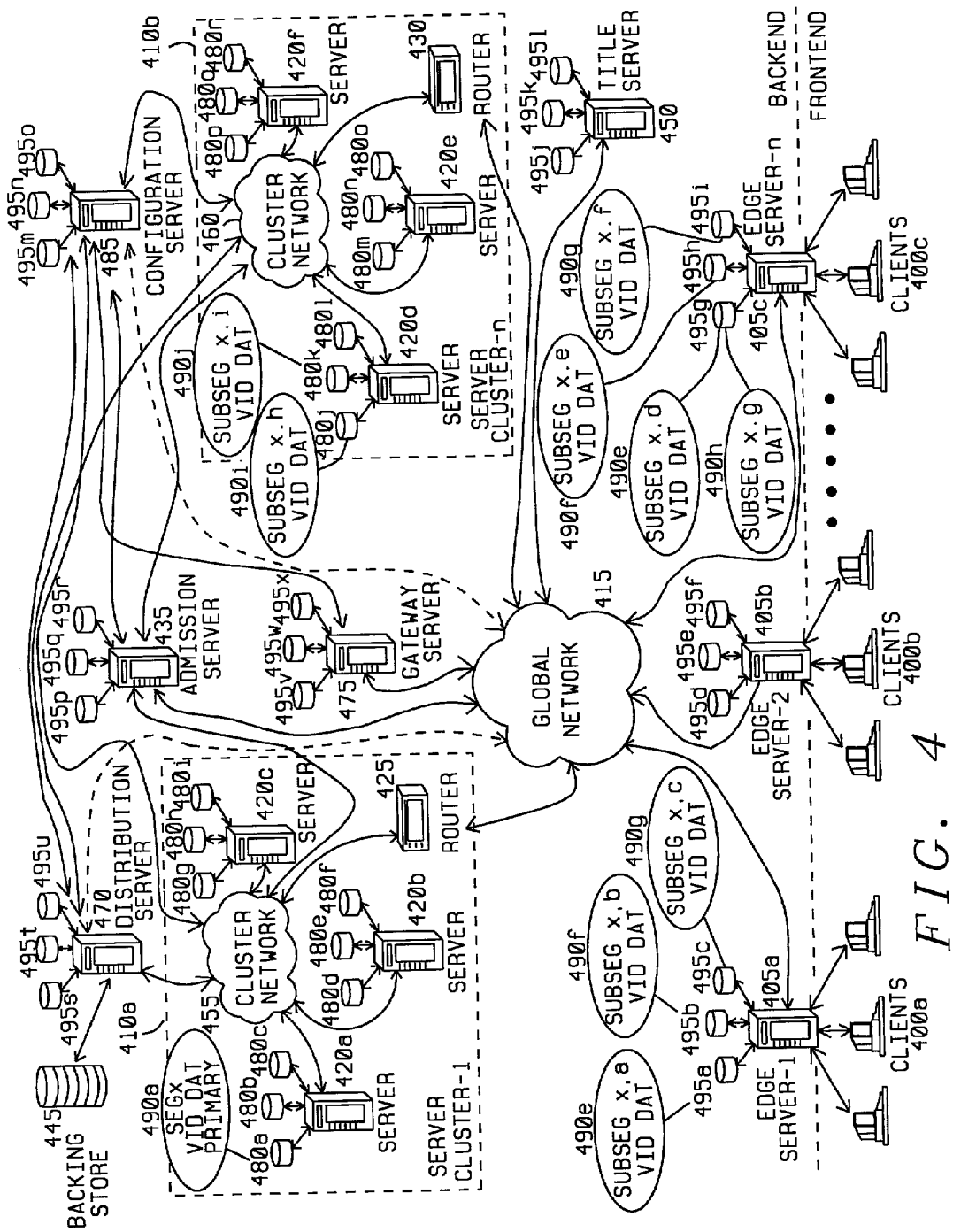
FIG. 4 is a diagram of a distributed computer network system illustrating load balancing of data storage devices with variable segmentation of this invention.
Figure 5:
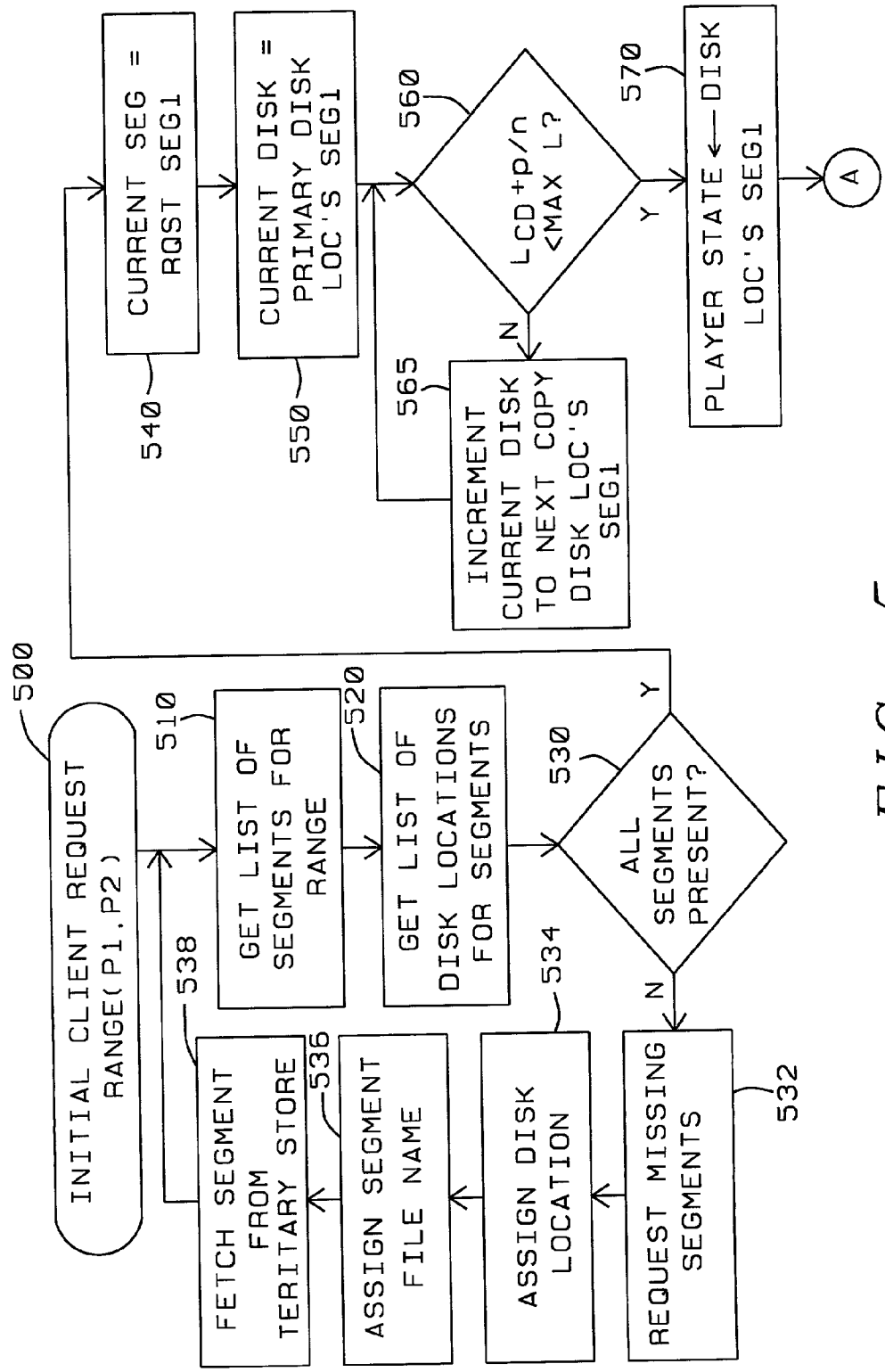
FIGS. 5, 6, and 7 are a flow diagrams illustrating the method of illustrating load balancing of data storage devices with variable segmentation of this invention.

Refer now to FIG. 4 for a description of a video distribution system of this invention. The client computing systems 400a, 400b, 400c are connected through a communications link to an edge server 405a, 405b, and 405c. Each edge server 405a, 405b, 405c acts as an interface for the client computing systems 400a, 400b, 400c to a global communications network 415. The edge servers 405a, 405b, 405c are at the boundary between the "front-end" and the "backend" of the video distribution system. The front-end being the client computing systems 400a, 400b, 400c that are the terminal points whereby the users can access the video distribution system. Further the edge servers 405a, 405b, 405c are generally Internet service providers to which the client computing systems 400a, 400b, 400c are in communication.

The backend of the video distribution system has server systems 420a, 420f that are grouped together to form server clusters 410a, . . . , 410b. The server systems 420a, 420b, and 420c are interconnected together through the cluster network 455. The server systems 420d, 420e, and 420f are interconnected together through the cluster network 460. The router 425 provides an interface for the server cluster 1 410a to the global communication network 415. Likewise, the router 430 provides an interface for the server cluster n 410b to the global communication network 415.

The gateway server 475 is connected through the global communication network 415 to the edge servers 405a, 405b, 405c and thus to the client computing systems 400a, 400b, 400c. The gateway server 475 is the central point of contact for incoming requests to the system from the client computing systems 400a, 400b, and 400c. When a client computing system 400a, 400b, 400c requests a video data file (on demand) or join a broadcast (multicast) of a video data file, it first contacts the gateway server 475. The gateway server 475 maintains an updated list of the server systems 420a, . . . , 420f in the system. Based on the location of the client computing systems 400a, 400b, 400c and the type of request, it routes the request to the appropriate server systems 420a, . . . , 420f.

A large-scale system containing thousands of video data files must offer an efficient and easy to use content management service to the client computing systems 400a, 400b, 400c. Such a content management service includes capabilities to add/delete, categorize, and browse video data files and is provided by the title server 450. In presence of a dedicated title server 450, the gateway server 475 redirects the client computing systems 400a, 400b, 400c requests to the title server 450. In the absence of such a dedicated title server 450, the gateway server 475 can be configured to provide content management services to client computing systems 400a, 400b, and 400c. Client computing systems 400a, 400b, 400c, then, browse video data file in the gateway server.

In a geographically distributed broadband video distribution system of this invention, there will be multiple title servers 450, each for a service region. The gateway server 475 will route the client computing systems 400a, 400b, 400c requests to appropriate title servers 450 based on the location of the client computing systems 400a, 400b, 400c.

A distribution server 470 is used to introduce new contents in the video distribution system of this invention. Once a new video data file is available, a media distributor uses this service to propagate the title to different service regions of a geographically distributed system. The distribution server 470 consists of four distinct components. A Distribution Center, which is a remote service, is used by media distributors to push new video data files to regional server systems 420a, 420f. A Distributor Console, a network (Internet) based remote graphical user interface (GUI), is used to specify locations and contents to be pushed to remote server systems 420a, . . . , 420f. A set of Asset Managers, which are local to regional server systems 420a, . . . , 420f, is responsible for managing and tracking contents in the regional server systems 420a, . . . , 420f. A set of asset databases, one database per regional server system 420a, . . . , 420f, which stores the meta data for the available contents (video data files) in that regional server systems 420a, . . . , 420f. Asset managers use this database to keep track of local video data files. Multiple asset managers can share one asset database. The title server 450 also uses this database to generate a categorized, browsable list of video data files.

A media distributor uses the distributor console to schedule distribution of new media data objects (video data files) to the a video distribution system of this invention. The new video data files generally reside in a tertiary storage 445 such as a robotic DVD. The media distributor specifies when to push the title, the list of target regional sites, and the textual meta data related to the video. Among other things, the meta data of a title will possibly contain information required to categorize it as well as a set of searchable strings, which can be used to search the content of the video data files. The distributor console connects with the remote distribution center 470 and delivers the schedule. The distributor console contacts the asset managers in the specified target server systems 420a, . . . , 420f, and schedules the delivery of the new content. Once a server system 420a, . . . , 420f, receives the new video data file, it first stores the content in any available space in a local disk 480a . . . , 480r. Then, it updates the asset database with the information on the new video data file (including the received meta data on the video data file). If it does not have any available space, it replaces an old video data file using a programmed policy.

Based on the client computing systems 400a, 400b, 400c request (browsing by category, or searching using a string), the title server 450 queries the asset database, and creates a list of video data files for the client computing systems 400a, 400b, 400c to browse. The title server 450 uses aggressive caching techniques to improve the performance of the query. When new information is added in the asset database, the cache in the title server 450 is invalidated.

It is sometimes possible for a title server 450 to have information on a video data file, which is not wholly available in the local storage 480a, . . . , 480r, for various reasons. Portions of the video data file may have been replaced because the asset manager needed space for a new video data file, or only a portion of a video data file was propagated from the distribution center. Once a client computing systems 400a, 400b, 400c requests such a video data file, server system 420a, . . . , 420f, fetches the video data file to the local storage 480a, . . . , 480r. The server system 420a, . . . , 420f allocates free space in the local storage 480a, . . . , 480r possibly by replacing a portion of a resident video data file. The server system 420a, . . . , 420f contacts the distribution server 470 providing the name of the video data file and the remaining portion of the video data file. Once the distribution server 470 is ready, the server system 420a, . . . , 420f fetches the remaining portion of the video data file, stores it in the allocated free space, and updates the asset database.

When a user of a client computing systems 400a, 400b, 400c selects a video data file to be viewed, the client computing systems 400a, 400b, 400c contacts the admission server 435, which based on the bandwidth requirements and the file location of the video data file, assigns a video server system 420a, 420f from the server clusters 410a, 410b.

The admission server 435 provides a set of mechanisms, which are used to implement different policies for load balancing. The admission server 435 maintains a cluster topology, a disk usage table, a node usage table, and a cluster map. The cluster topology maintains the connection information of the cluster. It itemizes a list of server systems 420a, . . . , 420f of a server cluster 410a, 410b, which can access any of the disks 480a, . . . , 480r. The cluster topology contains the server system 420a, . . . , 420f identification that is the mount point where a disk 480a, . . . , 480r is mounted, and the access status of the disk 480a, . . . , 480r.

The disk usage table maintains the capacity (maximum data rate in Mbps) and the current load (data rate in Mbps) for each disk 480a, . . . , 480r in the server cluster 410a, 410b. The node usage table maintains the streaming capacity (maximum data rate in Mbps) and the current load for each node in the server cluster 410a, 410b The cluster map maintains an up-to-date list of network address (internet protocol address), port and the status of the important server system 420a, . . . , 420f in the distribution system, and it maintains a list of server systems 420a, . . . , 420f in the cluster 410a, 410b, their network addresses and their status. A server system 420a, . . . , 420f can be in one of two states: Live (L) and Failed (D). Additionally, the admission server 435 maintains a supporting data structure, required to provide fault tolerance and authenticated access to the server cluster 410a, 410b. The data structure maintains a table containing the list of active sessions per server system 420a, . . . , 420f, and a similar table for active sessions per disk 480a, . . . , 480r.

The configuration server 485 allows an administrator to define and to configure server clusters 410a, 410b and the distributed server installations. It maintains an up-to-date information of the distributed installation using a periodic monitoring mechanism and asynchronous update events from the servers 420a, . . . , 420f in the system.

As described, the video data files may be several gigabytes in size. In order to facilitate the transfer of the video data files to client computing systems 400a, 400b, 400c for viewing by a user, it is desirable to fragment the video data file into smaller segments. Each segment is assigned a file name and a location within any of the disks 480a, . . . , 480r, and 495a, . . . , 495x. When a client computing system 400a, 400b, 400c requests a video data file, the admission server 435 retrieves the listing of the segments of the requested data file from the disk usage table. It should be noted, that the requested segment of the video data file may in fact be any portion of a larger video data file not just the whole video data file. It should further be noted that the portion of the video data file requested may not encompass whole segments by may also contain fractional segments.

One of the load balancing mechanisms employed by the admission server 435 dynamically segments a copy of a primary video data file 490a and copies to the segments to other disk files 480a, . . . , 480r, and 495a, . . . , 495x based on the loading on each of the disk files 480a, . . . , 480r, and 495a, . . . , 495x and the bandwidth of from the client computing systems 400a, 400b, 400c to the disk files 480a, . . . , 480r, and 495a, . . . , 495x. The admission server 435 receives requests for the content of the video data file 490a. The admission server 435 then analyzes the a cluster topology, a disk usage table, a node usage table, and a cluster map to determine which server system 420a, . . . , 420f or edge server system 405a, 405c has sufficient capacity to accept a copy of the segment X of the of the video data file 490a. If there is not sufficient capacity for a single copy of the segment X of the video data file 490a, The admission server 435 analyzes the cluster topology, the disk usage table, the node usage table, and the cluster map to determine whether a segmented copy of the can be distributed to the server system 420a, . . . , 420f or edge server system 405a, . . . , 405c. Upon determination of the available capacity, the segment X of the video data file 490a is divided into sub-segments and written, for instance, to edge server systems 405a and 405b. The sub-segments 490a, 490b, and 490c are transferred to the disk files 495a, 495b, and 495d and streamed as requested.

The sub-segments 490a, 490b, and 490c are placed as shown such that the loading of the disk files 495a, 495b, and 495d and the bandwidth available to the requesting client systems 400a, 400b, and 400c allow isochronous transfer of the video data files. In this example, the files 495a and 495b of the edge server 405a stores the first two sub-segments 490b and 490c and the disk file 495d of the edge server 405b stores the third sub-segment 490d.

When other requests are made for the segment X of the video data file 490a. The admission server 435 further analyzes the a cluster topology, a disk usage table, a node usage table, and a cluster map to determine which server system 420a, . . . , 420f or edge server system 405a, . . . , 405c has sufficient capacity to accept sub-segmented copies of the segment X of the of the video data file 490a. The examples as shown have the sub-segments 490e and 490h stored in the disk file 495g, the sub-segment 490f stored in the disk file 495h, and the sub-segment 490g stored in the disk file 495i. In this illustration the scheduling of the requests and the capacity of the bandwidth from the edge server 405c allows the sub-segments 490e and 490h to be stored to the same disk file 495g, while the remaining sub-segments 490f and 490g are stored in separate disk files 495h and 495i.

Refer now to FIGS. 5, 6, 7, and 8 for a description of the method for balancing of the loading on storage devices by variable segmenting of video data files of this invention. The video data files or segments of the video data files are copied and distributed to other disks 480a, . . . , 480r, and 495a, . . . , 495x according to the activity of the disks 480a, . . . , 480r, and 495a, . . . , 495x and the request patterns for the video data file by the client computing system 400a, 400b, 400c. The client 400a, 400b, and 400c requests (Box 500) a video data file (or portion of a video data file) according to an identification (file name) of the requested segment of the video data file and a range or indication of the beginning location and size of the requested segment of the video data file. The admission server 435 retrieves (Box 510) a disk usage table describing the segments contained within the range of the requested segment of the video data file. Further, the admission server 435 retrieves (Box 520) locations on the disks 480a, . . . , 480r, and 495a, . . . , 495x of the segments of the video data file. The contents of the disk usage table are interrogated (Box 530) to verify the presence of all the requested segments or the total video data file.

If the results of the interrogation (Box 530) of the disk indicates the video data file or a segment of the video data file are not present on the disks 480a, . . . , 480r, and 495a, . . . , 495x, the admission server 435 requests (Box 532) the missing video data file or segments of the video data file from the backing store 445 through the distribution server 470. The admission server 435 assigns (Box 534) a disk 480a, . . . , 480r, and 495a, . . . , 495x that is to receive the video data file or the segments of the video data file based on the available space and disk activity. If the video data file is segmented, the admission server 435 assigns (Box) 536) segment file names to the individual segments of the video data file. The video data files are fetched (Box 538) from the tertiary or backing store 445 and placed in the assigned locations.

The admission server 435 then requests (Box 510 and Box 520) an updated list of the segments of the requested range of the video data file. Once the interrogation (Box 530) by the admission server 435 verifies the presence of the complete video data file, a current segment counter in the admission server 435 is set (Box 540) to request the first segment of the requested range of the video data file. The current disk pointer in the admission server 435 is assigned (Box 550) the location of the first segment of the requested range.

Since the request of the video data is being scheduled at this point, only a portion of the loading P or over all bandwidth for the requested segment of the video data file is allocated to the loading (bandwidth) factor $L_{CD}$ of the disks 480a, . . . , 480r, and 495a, . . . , 495x. There is, for purposes of this embodiment, an equal probability that any of the video data files or segments of the video data files will be transferred at a given time to the requesting edge server 405a, 405b, and 405c and streamed to the client 400a, 400b, and 400c. Therefore, a new loading factor for one of the disks 480a, . . . 480r, and 495a, . . . , 495x becomes $$L'_{CD} = L_{CD} + P/n \qquad \text{Eq. 1}$$

where:
$L'_{CD}$ is the new loading factor or amount of bandwidth of the disk allocated with the requested segment.
$L_{CD}$ is the current loading factor or bandwidth of the disk being consumed by the current disk activities.

P is the required bandwidth of the segment being requested
n is the number of copies of the requested video data file. In most applications only one copy of the video data file is requested.

The new loading factor $L'_{CD}$ is compared (Box 560) to a maximum loading factor (MaxL). If the new loading factor $L'_{CD}$ exceeds the maximum bandwidth of loading factor (MaxL), the current disk pointer is set (Box 565) to the location of the disk containing the next location of the first segment of the requested segment of the video data file. The admission server 435 schedules the transfer and sends the disk location of the first segment of the requested segment of the video data file to the edge server 405a, 405b, and 405c requesting the video data file. The edge server 405a, 405b, and 405c contains the player program that streams the requested segment of the video data file to a client or clients 400a, 400b, and 400c the video data file. The player state is assigned (Box 570) the location of the first segment of the video data file.

Figure 6:
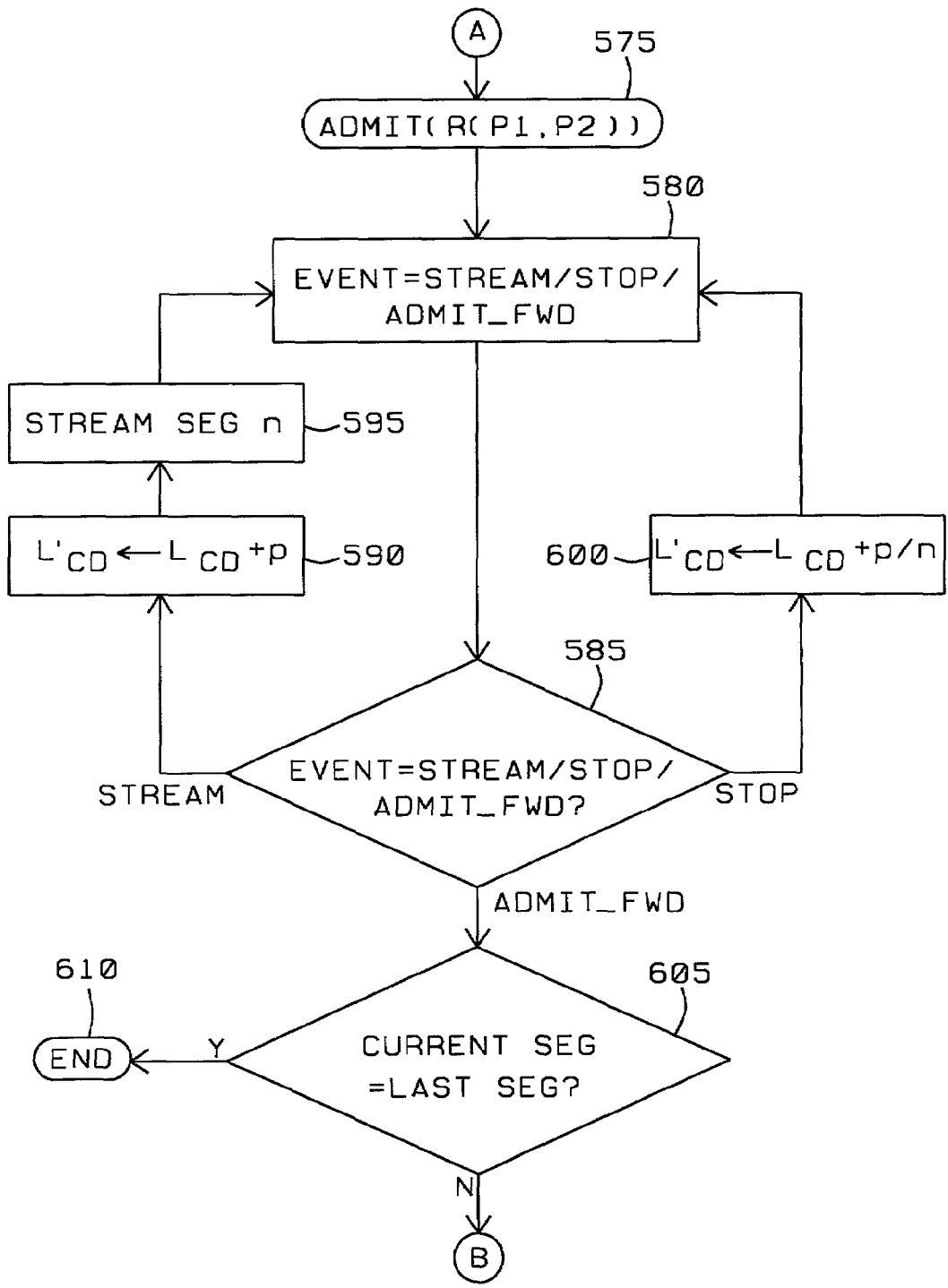

Referring to FIG. 6, the admission server 435 transmits (Box 575) an authorization to the edge server 405a, 405b, and 405c granting the edge server 405a, 405b, and 405c permission to admit or request the range (R) with the beginning location (P1) and the ending location (P2) for the segment. The edge server 405a, 405b, and 405c assigns (Box 580) the event register the code whether the client 400a, 400b, and 400c is going to start to stream the segment, to continue to stream the segment, or if the current segment has been viewed sufficiently, to start the processing for accessing the next segment (admit forward).

The event register is tested (Box 585) and if the segment is to be streamed, the current loading factor $L_{CD}$ of the disk containing the segments to be streamed is assigned (Box 590) the loading factor as determined by Eq. 1. The requested segment is transferred from the disk 480a, . . . , 480r, and 495a, . . . , 495x location to the edge server 405a, 405b, and 405c and then streamed (Box 595) to the client or clients 400a, 400b, and 400c for viewing. The event register is then assigned (Box 580) the codes for the next event of the process and tested (Box 585).

If, in this case, the client 400a, 400b, or 400c has requested that the viewing be stopped, the load factor $L_{CD}$ is assigned a non-active value of Eq. 1. The admission server 435 allocates the load across all copies of the segment in anticipation of the client 400a, 400b, and 400c resuming the request to view the segment of the requested segment of the video data file, while recognizing that the request may be rerouted to another copy of the segment of the requested segment of the video data file.

The event register is assigned (Box 580) the code for the next event and tested (Box 585). If the current segment is streamed to a predetermined location (approximately midway through the segment) within the video data file, the next segment is scheduled for transfer. If the event register is assigned a code for the admit forward operation, the current segment register is tested (Box 605) to determine if the last segment of the range of the requested data file is being streamed. If it is the last segment, the process ends, (Box 610).

Figure 7:
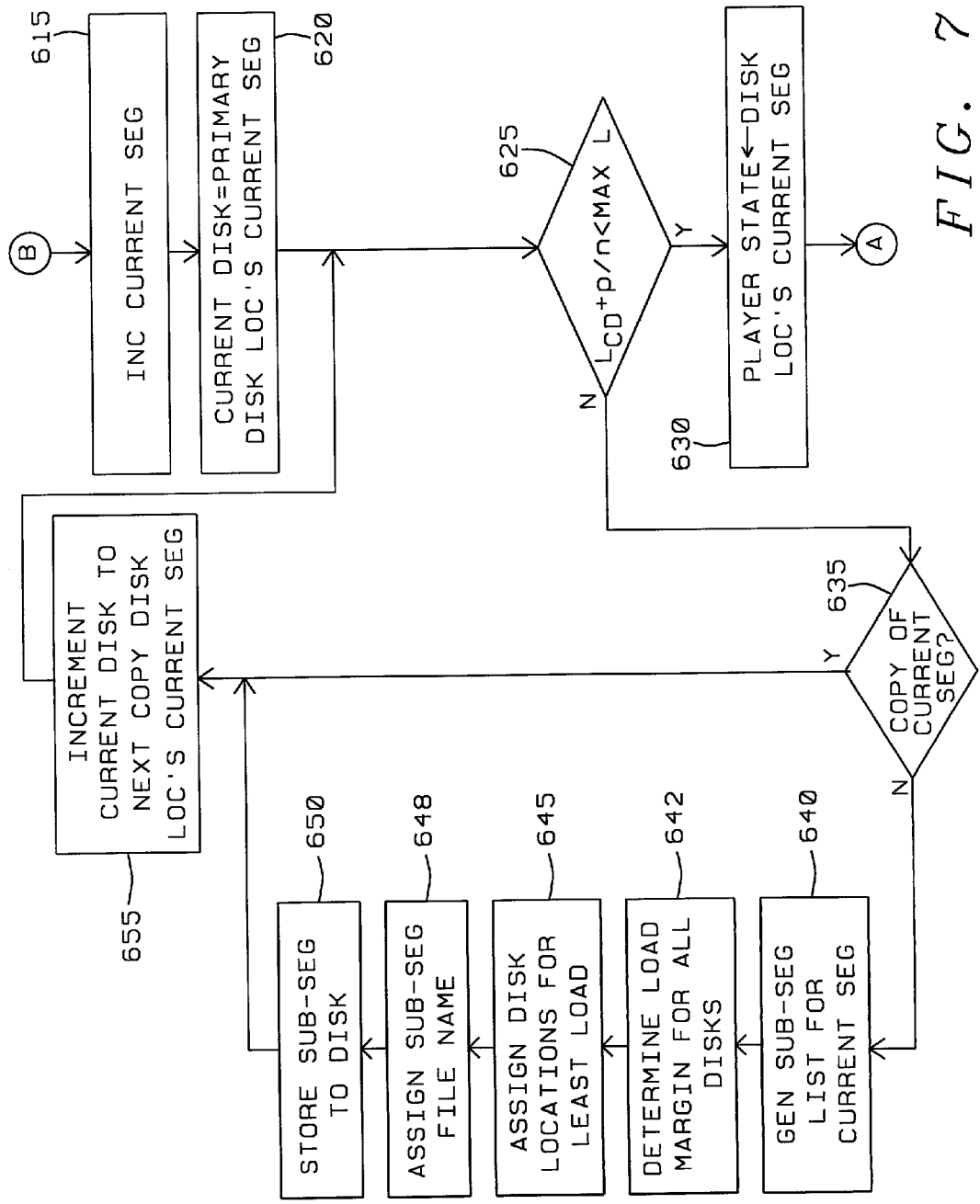

Referring now to FIG. 7, if there are more segments to be streamed, the current segment counter is incremented (Box 615) and the current disk register is assigned (Box 620) the disk location of the next segment to be processed.

The disk-loading factor $L_{CD}$ with the additional loading of the requested segment is assigned as determined by Eq. 1. The newly allocated disk loading factor $L_{CD}$ is compared (Box 625) to the maximum available loading or bandwidth (MaxL). If there is not sufficient allocable bandwidth, the listing of available copies is queried (Box 635) to find an available copy of the current requested segment. If all the disks 480a, ..., 480r, and 495a, ..., 495x containing copies of the current segment have their loading factors $L_{CD}$ or bandwidths fully allocated, the admission server 435 generates (Box 640) a sub-segment listing for the current segment. The loading for all the disks 480a, ..., 480r, and 495a, ..., 495x is analyzed and the load margin for all disks 480a, ..., 480r, and 495a, ..., 495x is determined (Box 642). The sub-segments of the current segment are assigned (Box 645) to the disks 480a, ..., 480r, and 495a, ..., 495x with the least loading. As noted above, the sub-segments may be placed on different disks 480a, ..., 480r, and 495a, ..., 495x and even different server systems 420a, ... 420f or different edge servers 400a, ..., 400c. The admission server 435 assigns (Box 648) each of the sub-segments an individual file name and the sub-segments are stored (Box 650) to the assigned locations on the disks 480a, ..., 480r, and 495a, ..., 495x.

If there is a copy of the currently requested segment or the distribution server 470 has copied the segment to a new disk location, the current disk counter is incremented to point to the location of the next copy (newly copied) of the currently requested segment of the video data file.

The loading factor $L_{CD}$ for the current disk containing the copy of the currently requested segment is again compared 625 to the maximum loading factor (MaxL) of the disk. If the allocated current loading factor $L_{CD}$ is less than the maximum loading factor (MaxL) or maximum bandwidth of the disk 480a, ... 480r, and 495a, ... 495x containing the currently requested segment, the player state is assigned (Box 630) the point to the disk location of the currently requested segment. The currently requested segment is processed as described above for FIG. 5 and the process is repeated until the last segment of the requested range is streamed to the client 400a, 400b, and 400c, where the processing ends (Box 630).

Figure 8:
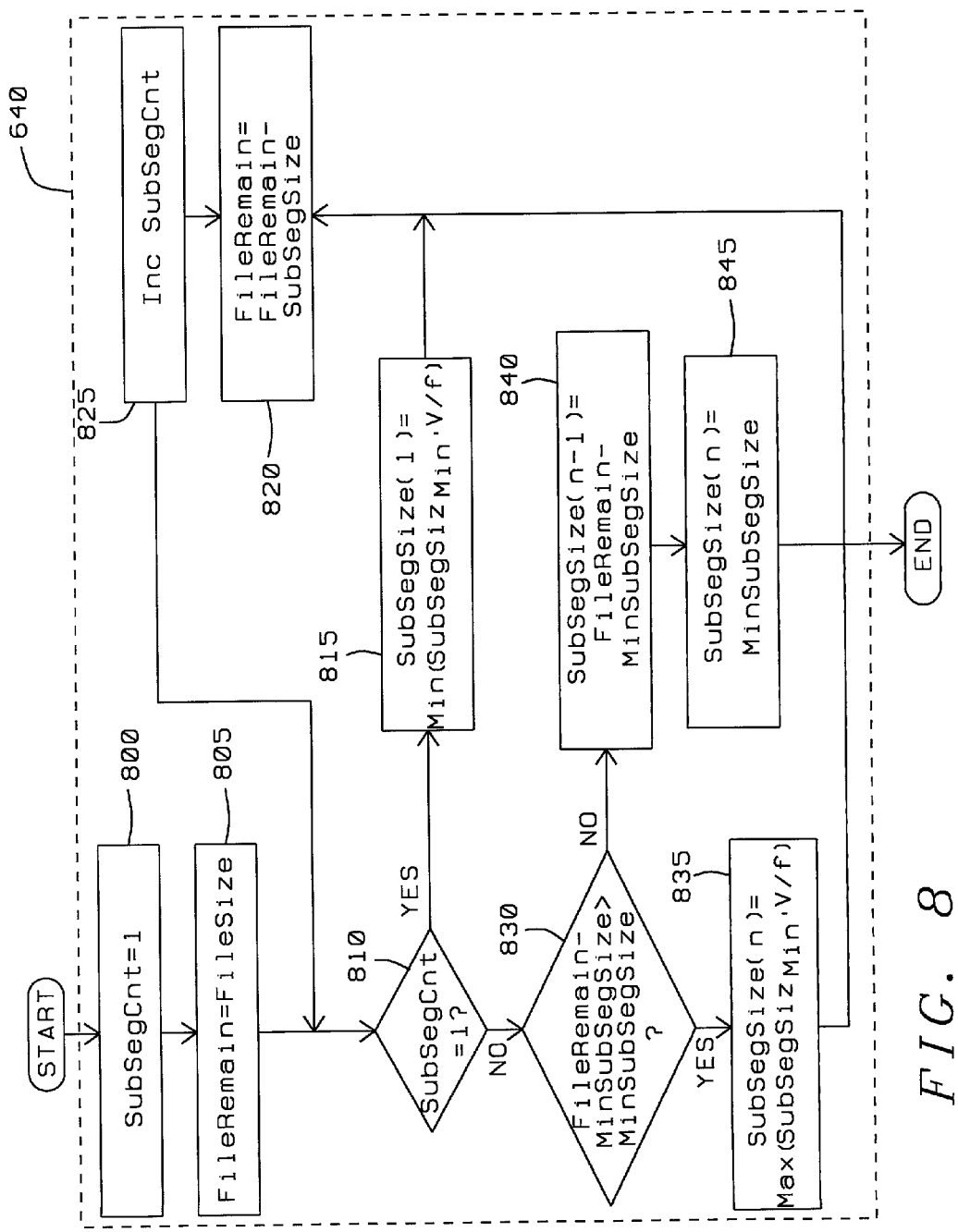
FIG. 8 is a flow diagram illustrating the method of sub-segmenting requested segments of this invention.

Refer now to FIG. 8 for a discussion of the calculation (Box 640 of FIG. 7) of a new sub-segment listing of a video data file or a portion of a video data file. The sub-segmentation process begins when the admission server 435 has determined that there is no available copy of the requested current segment of the video data file.

The method begins by initiating (Box 800) a sub-segment counter to indicate a first sub-segment of the segment of the video data file. A file remaining indicator denotes the amount of the segment of the video data file remaining to be sub-segmented. The file remaining indicator is set (Box 805) to the total file size of the requested segment of the video data file.

The sub-segment counter is then tested (Box 810) to indicate whether the first sub-segment is being created. During the creation of the first sub-segment, the first sub-segment size is determined (Box 815) by the formula:

$$SubSeg1 = \min(SubSegSize_{min}, V/f)$$

where
SubSeg1 is the first sub-segment size,
min is the minimum function of two variables,
$SubSegSize_{min}$ is the minimum sub-segment size allowed during the fragmenting of the segment of the video data file, The minimum sub-segment size is empirically determined and is usually about 5 second of the playing time of the segment of the video data file.

V is a total size of a segment of the digital data file, and f is determined by the formula:

$$f = N_d + (M_I/M_I - C_I) + H + I$$

where
$N_d$ is the number of storage devices available to retain the sub-segments of the segments of the digital data file,
$M_I$ is the maximum digital data transfer load,
$C_I$ is the current digital data transfer load,
H is the file usage factor (to be discussed hereinafter), and
I is the file Interactivity factor (to be discussed hereinafter).

The file remaining indicator is decremented (Box 820) by the size of the first sub-segment size and the sub-segment counter is incremented (Box 825) to the next sub-segment to have its size determined.

The file remaining indicator less the minimum sub-segment size is compared (Box 830) to the minimum sub-segment size. If the file remaining indicator less the minimum sub-segment size is not less than the minimum sub-segment size, the next sub-segment is now determined by the formula:

$$SubSegn = \max(SubSegSize_{min}, V/f)$$

where
SubSegn is the a sub-segment size for one sub-segment of the remaining sub-segments,
max is the maximum function of two variables,
$SubSegSize_{min}$ is the minimum sub-segment size allowed during the fragmenting of the segment of the video data file,
V is a total size of a segment of the digital data file, and f is determined by the formula:

$$f = N_d + (M_I/M_I - C_I) + H + I$$

where
$N_d$ is the number of storage devices available to retain the sub-segments of the segments of the digital data file,
$M_I$ is the maximum digital data transfer load,
$C_I$ is the current digital data transfer load,
H is the file usage factor (to be discussed hereinafter), and
I is the file interactivity factor (to be discussed hereinafter).

The file remaining indicator is now decremented (Box 820) by the new sub-segment size and the sub-segment counter is incremented (Box 825) to the next sub-segment for which the size is to be determined.

This determining of the subsequent sub-segment size continues until the size of the file remaining less the minimum sub-segment size is less than the minimum sub-segment size. At this point, the next to the last sub-segment (n−1) is set (Box 840) to the size of the segment remaining less the minimum sub-segment size. The last sub-segment is set (Box 845) to the minimum sub-segment size.

The admission server 435 then assigns file names to each sub-segment described in the sub-segment listing and allocates locations within the disks 480a, ..., 480r of the server systems 420a, ..., 420f. The sub-segmented video data file 490a is transferred from the distribution server 470 to the server systems 420a to be written to the disks 480a, 480b, 480c.

It is apparent that there can be not only multiple copies of a video data file within the video distribution system of this invention, but multiple copies of the segments of the video data file that are further divided into sub-segments as the requests video data files or portions of video data files indicate that new segment sizes are required. The copying of the segments of the video data files and the further dividing the segments of the video data files into sub-segments is dynamically executed dependent on the bandwidth allocation of the disks 480*a*, 480*r*, and 495*a*, . . . , 495*x*. Thus, various segments and sub-segments of a video data file may have various numbers of copies on multiple disks 480*a*, . . . , 480*r*, and 495*a*, . . . , 495*x* to allow the segments and sub-segments to have the appropriate bandwidth to stream the segments to the clients 400*a*, 400*b*, and 400*c*. This allows the viewers to select various segments and the system to adjust the bandwidth accordingly to allow the viewer (client 400*a*, 400*b*, and 400*c*) demand.

The video distribution system as shown in FIG. 4 illustrates a system having local cluster networks 455, and 460, and the global communication network 415. It is apparent that the server clusters 410*a* and 410*b* do not require the cluster networks 455 and 460 to virtually construct the server clusters 410*a* and 410*b*. Further, the disks 480*a*, . . . , 480*r* may be grouped in such fashion that they can be associated with one or more of the server systems 420*a*, . . . , 420*f*. The generalized structure allows the configuration server 485 to allocate the functions of the system to any of the server systems 420*a*, . . . , 420*f*. For instance the admission server 435 and the gateway server 475 may in fact be the same computing system and additionally, may be one of the server systems 420*a*, . . . , 420*f*. Also, any of the edge servers 405*a*, 405*b*, or 405*c* may physically be on of the server systems 420*a*, . . . , 420*f*.

The segments and sub-segments of the video data files 490*a* are shown as distributed over multiple disks 480*a*, 480*b*, and 480*c*, associated with the server system 420*a*. Depending on the file usage factors, and the interactivity factors, various segments or copies of segments 490*a*, . . . , 490*h* may be placed at other server systems 420*a*, . . . , 420*f*, on the admission server 435, the configuration server 485, or even an edge server 405*a*, 405*b*, or 405*c*. The distribution of the segments 490*a*, . . . , 490*h* allows the balancing of the loading (the amount of data being transferred) of the disks 480*a*, . . . , 480*r* and disks 495*a*, . . . , 495*w*. The admission server 435 controls the placement of the segments and sub-segments and will eliminate segments of video data file based on a policy that will erase those segments that are least recently used, starting at the end of a video data file. Thus certain video data files may have a low number of segments present on the disks 480*a*, . . . , 480*r* of the server systems 420*a*, . . . , 420*f*. A request for a video data file having segments or sub-segments missing requires that the distribution server 470 recreate the segments or sub-segments of the video data file requested and transfer them to the server systems 420*a*, . . . , 420*f*. However, those video data file segments and sub-segments at the beginning of the video data file can be transferred to the client system 400*a*, 400*b*, 400*c* for viewing, while the distribution server 470 is recreating those missing segments.

The load or the amount of data being transferred to or from an individual disks 480*a*, . . . , 480*r* and 496*a*, . . . , 495*w* is allocated between a read action (transferring the video data file isochronously to a client system 400*a*, 400*b*, 400*c* for viewing by a user), a write action (transferring the video data file to a disk 480*a*, . . . , 480*r* and 495*a*, . . . , 495*w*), or a copy action (a disk to disk transfer of the video data file). The total bandwidth or transfer rate for a single disk is thus divided in the read action, the write action, or the copy action. The load of the disk is the amount of the total bandwidth consumed for the transfer of the requested segment of the video data files resident on the disk. Therefore, the segment size is determined by the number of disks 480*a*, . . . , 480*r* and 495*a*, . . . , 495*w* available to contain the video data file (some maybe off line or too full to accept the video data file) and the loading of the available disks.

It is well known in the art that while the above describes a system to distribute video data files to client systems, the apparatus is implemented as a program code for execution on a computing system. The program code maybe obtained from media such as storage nodes of the cluster network or the global communication network, or stored on storage media such a read only memory (ROM), or a magnetic disk. The program code executed by the computing system executes the method for segmenting video data files to facilitate the transfer of the video data files. The program executed is as described in FIG. 6.

While this invention has been particularly shown and described with reference to the preferred embodiments thereof, it will be understood by those skilled in the art that various changes in form and details may be made without departing from the spirit and scope of the invention.

The invention claimed is:

1. A method for balancing a loading of a data storage devices attached to multiple computing systems during transfer of a requested data object to or from said data storage devices, comprising the steps of:
   acquiring a listing of locations of all segments of the requested data object including all copies of said segments of the requested data object;
   evaluating the loading of the data storage devices attached to the multiple computing systems containing all copies of all segments of the requested data object;
   selecting data storage devices containing copies of each segment of the requested data object having a least loading and is less than a maximum loading for said data storage devices;
   if the loading of the data storage devices is greater than the maximum loading for said storage devices, generating a sub-segment list for any segment of the requested data object residing on said data storage device would have a loading greater than the maximum loading if said segment of the requested data object were transferred, determining a load margin for all available storage devices, assigning locations for each sub-segment on each available data storage device having the least loading, and assigning file names to each sub-segment;
   selecting said each available data storage device containing each segment and sub-segment; and
   transferring those segments of said requested data object to a requesting computer system.

2. The method of claim 1 wherein generating the new sub-segment list comprises the steps of:
   determining a number of all available data storage devices that may retain a plurality of sub-segments of said sub-segment of the requested data object;
   determining a maximum data object transfer load for the available data storage devices;
   assigning a minimum sub-segment size which is the smallest amount of data to be contained within one sub-segment of the segment;
   calculating a first sub-segment size as a first function of a number of the data storage devices, the current digital data transfer load, the maximum digital data transfer load, and the minimum sub-segment size;

assigning a last sub-segment size as the minimum sub-segment size;
calculating all remaining sub-segment sizes as a second function of the number of the data storage devices, the current digital data transfer load, the maximum data object transfer load, and the minimum sub-segment size; and
partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

3. The method of claim 2 wherein the first function to determine the first sub-segment size is:

$$SubSeg1=\min(SubSegSize_{min}, V/f)$$

where
SubSeg1 is the first sub-segment size,
min is the minimum function of two variables,
V is a total size of a segment of the data object, and
f is determined by the formula:

$$f=N_d+(M_I/M_I-C_I)$$

where
$N_d$ is the number of data storage devices available to retain the sub-segments of the segments of the data object,
$M_I$ is the maximum data object transfer load, and
$C_I$ is the current data object transfer load.

4. The method of claim 2 wherein the second function to determine the remaining sub-segment sizes is:

$$SubSegn=\max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f=N_d+(M_I/M_I-C_I)$$

where
$N_d$ is the number of data storage devices available to retain the sub-segments of the segments of the data object,
$M_I$ is the maximum data object transfer load, and
$C_I$ is the current data object transfer load.

5. The method of claim 2 wherein generating the new sub-segment list further comprises the step of:
determining a file interactivity factor describing a number of jumps by the second computing system within the data object.

6. The method of claim 5 wherein the first function is further dependent upon the file interactivity factor.

7. The method of claim 6 wherein the first function to determine the first sub-segment size is:

$$SubSeg1=\min(SubSegSize_{min}, V/f)$$

where
SubSeg1 is the first sub-segment size,
min is the minimum function of two variables,
V is a total size of a segment of the data object, and
f is determined by the formula:

$$f=N_d+(M_I/M_I-C_I)+I$$

where
$N_d$ is the number of data storage devices available to retain the sub-segments of the segments of the data object,
$M_I$ is the maximum data object transfer load,
$C_I$ is the current data object transfer load, and
I is the file interactivity factor.

8. The method of claim 5 wherein the second function is further dependent upon the file interactivity factor.

9. The method of claim 8 wherein the second function to determine the remaining sub-segment sizes is:

$$SubSegn=\max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f=N_d+(M_I/M_I-C_I)+I$$

where
$N_d$ is the number of data storage devices available to retain the sub-segments of the segments of the data object,
$M_I$ is the maximum data object transfer load,
$C_I$ is the current data object transfer load, and
I is the file Inter activity factor.

10. The method of claim 9 wherein the second function is further dependent upon the file usage factor.

11. The method of claim 10 wherein the second function to determine the remaining sub-segment sizes is:

$$SubSegn=\max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f=N_d+(M_I/M_I-C_I)+H$$

where
$N_d$ is the number of data storage devices available to retain the sub-segments of the segments of the data object,
$M_I$ is the maximum data object transfer load,
$C_I$ is the current data object transfer load, and
H is the file usage factor.

12. The method of claim 2 wherein generating the new sub-segment list further comprises the step of:
determining a file usage factor describing a number of requests for said data object for a period of time.

13. The method of claim 12 wherein the first function is further dependent upon the file usage factor.

14. The method of claim 13 wherein the first function to determine the first sub-segment size is:

$$SubSeg1=\min(SubSegSize_{min}, V/f)$$

where
SubSeg1 is the first sub-segment size,
min is the minimum function of two variables,
V is a total size of a segment of the data object, and
f is determined by the formula:

$$f=N_d(M_I/M_I-C_I)+H$$

where
- $N_d$ is the number of data storage devices available to retain the sub-segments of the segments of the data object,
- $M_I$ is the maximum data object transfer load,
- $C_I$ is the current data object transfer load, and
- H is the file usage factor.

15. The method of claim 2 wherein generating the new sub-segment list further comprises the steps of:
  determining a file usage factor describing a number of requests for said data object for a period of time; and
  determining a file interactivity factor describing a number of jumps by the second computing system within the data object.

16. The method of claim 15 wherein the first function is further dependent upon the file usage factor and the file interactivity factor.

17. The method of claim 16 wherein the first function to determine the first sub-segment size is:

$$SubSeg1 = min(SubSegSize_{min}, V/f)$$

where
- SubSeg1 is the first sub-segment size,
- min is the minimum function of two variables,
- V is a total size of a segment of the data object, and
- f is determined by the formula:

$$f = N_d + (M_I/M_I - C_I) + H + I$$

where
- $N_d$ is the number of data storage devices available to retain the sub-segments of the segments of the data object,
- $M_I$ is the maximum data object transfer load,
- $C_I$ is the current data object transfer load,
- H is the file usage factor, and
- I is the file Inter activity factor.

18. The method of claim 15 wherein the second function is further dependent upon the file usage factor and the file interactivity factor.

19. The method of claim 18 wherein the second function to determine the remaining sub-segment sizes is:

$$SubSegn = max(SubSegSize_{min}, V/f)$$

where
- SubSegn is the a sub-segment size for one sub-segment of the remaining sub-segments,
- max is the maximum function of two variables,
- V is a total size of a segment of the data object, and
- f is determined by the formula:

$$f = N_d + (M_I/M_I - C_I) + H$$

where
- $N_d$ is the number of data storage devices available to retain the sub-segments of the segments of the data object,
- $M_I$ is the maximum data object transfer load,
- $C_I$ is the current data object transfer load, and
- H is the file usage factor.

20. The method of claim 1 further comprising the steps of:
  determining the presence of all segments and sub-segments of the requested data object;
  if there are missing segments and sub-segments of the requested data object, assigning each of those missing segments and sub-segments a file identification and file location, such that those missing segments and sub-segments are assigned to data storage devices having the least loading; and
  retrieving those missing segments and sub-segments from a back-up data storage device.

21. The method of claim 1 wherein selecting the data storage devices containing copies of the segments of the requested data object and having the least loading comprises the steps of:
  setting a current segment indicator to indicate which of the segments of the data object is to be transferred next;
  setting a current data storage device indicator to specify a primary location of the segment to be transferred next;
  if the transfer of said segment causes the loading of the data storage device containing said segment to be exceeded, incrementing the current data storage device indicator to a next location of the segment to be transferred; and
  repeatedly incrementing said current data storage device indicator until said loading is not exceeded.

22. The method of claim 1 wherein transferring of the segments of the data object comprises the actions of reading said segments from the data storage device, writing said segments to the data storage device, and copying said segments from a said data storage device to an alternate data storage device, whereby said loading of the data storage device is allocated between the reading, writing, and copying of the segments to prevent interference with said reading of the segments.

23. The method of claim 1 wherein the requested data object is a video data file to be streamed isochronously to the requesting computer system.

24. A data object service system in communication with a plurality of computing systems to provide at least one data object of plurality of data objects to at least one of the plurality of computing system, comprising:
  a plurality of data object storage devices in communication with each other and with any of the plurality of computing systems; and
  a load balancing apparatus in communication with the plurality of data object storage devices to balance a loading of said data object storage devices during transfer of said data objects,
  whereby said load balancing apparatus comprises:
    a load evaluator to assess the loading of the data object storage devices containing segments of said data objects,
    a data object storage device selector to create a selection list to indicate selection of those data object storage devices containing copies of each segment of a requested data object having the least loading, and
    a copying initiator to initiate a copying and further segmenting of a segment of the data object to an alternate data object storage devices having low loading if all data object storage devices containing said segment have a loading greater than a maximum loading, whereby said copying initiator generates a sub-segment list for any segment of the requested data object residing on said data object storage device that would have a loading greater than the maximum loading if said segment of the requested data object were transferred, determines a load margin for all available data object storage devices, assigns locations for each sub-segment on each available data object storage device having the least loading, and assigns file names to each sub-segment.

25. The system of claim 24 wherein generating the new sub-segment size comprises the steps of:

determining a number of all available data object storage devices that may retain a plurality of sub-segments of said sub-segment of the requested data object;

determining a maximum data object transfer load for the available data object storage devices;

assigning a minimum sub-segment size which is the smallest amount of data to be contained within one sub-segment of the segment;

calculating a first sub-segment size as a first function of a number of the data object storage devices, the current digital data transfer load, the maximum digital data transfer load, and the minimum sub-segment size;

assigning a last sub-segment size as the minimum sub-segment size;

calculating all remaining sub-segment sizes as a second function of the number of the data object storage devices, the current digital data transfer load, the maximum data object transfer load, and the minimum sub-segment size; and partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

26. The system of claim 25 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the data object, and
f is determined by the formula:

$$f = N_d + (M_I/M_T - C_I)$$

where
$N_d$ is the number of data object storage devices available to retain the sub-segments of the segments of the data object,
$M_I$ is the maximum data object transfer load, and
$C_I$ is the current data object transfer load.

27. The system of claim 25 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_I/M_T - C_I)$$

where
$N_d$ is the number of data object storage devices available to retain the sub-segments of the segments of the data object,
$M_I$ is the maximum data object transfer load, and
$C_I$ is the current data object transfer load.

28. The system of claim 25 wherein generating the new sub-segment list further comprises the step of:

determining a file interactivity factor describing a number of jumps by the second computing system within the data object.

29. The system of claim 28 wherein the first function is further dependent upon the file interactivity factor.

30. The system of claim 29 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the data object, and
f is determined by the formula:

$$f = N_d + (M_I/M_T - C_I) + I$$

where
$N_d$ is the number of data object storage devices available to retain the sub-segments of the segments of the data object,
$M_I$ is the maximum data object transfer load,
$C_I$ is the current data object transfer load, and
I is the file interactivity factor.

31. The system of claim 28 wherein the second function is further dependent upon the file interactivity factor.

32. The system of claim 31 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_I/M_T - C_I) + I$$

where
$N_d$ is the number of data object storage devices available to retain the sub-segments of the segments of the data object,
$M_I$ is the maximum data object transfer load,
$C_I$ is the current data object transfer load, and
I is the file Inter activity factor.

33. The system of claim 25 wherein generating the new sub-segment list further comprises the step of:

determining a file usage factor describing a number of requests for said data object for a period of time.

34. The system of claim 33 wherein the first function is further dependent upon the file usage factor.

35. The system of claim 34 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the data object, and
f is determined by the formula:

$$f = N_d + (M_I/M_T - C_I) + H$$

where
$N_d$ is the number of data object storage devices available to retain the sub-segments of the segments of the data object,
$M_I$ is the maximum data object transfer load,
$C_I$ is the current data object transfer load, and
H is the file usage factor.

36. The system of claim 33 wherein the second function is further dependent upon the file usage factor.

37. The system of claim 36 wherein the second function to determine the remaining sub-segment sizes is:

$$SubSegn = max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_I/M_I - C_I) + H$$

where
$N_d$ is the number of data object storage devices available to retain the sub-segments of the segments of the data object,
$M_I$ is the maximum data object transfer load,
$C_I$ is the current data object transfer load, and
H is the file usage factor.

38. The system of claim 25 wherein generating the new sub-segment list further comprises the steps of:
determining a file usage factor describing a number of requests for said data object for a period of time; and
determining a file interactivity factor describing a number of jumps by the second computing system within the data object.

39. The system of claim 38 wherein the first function is further dependent upon the file usage factor and the file interactivity factor.

40. The system of claim 39 wherein the first function to determine the first sub-segment size is:

$$SubSeg1 = min(SubSegSize_{min}, V/f)$$

where
SubSeg1 is the first sub-segment size,
min is the minimum function of two variables,
V is a total size of a segment of the data object, and
f is determined by the formula:

$$f = N_d + (M_I/M_I - C_I) + H + I$$

where
$N_d$ is the number of data object storage devices available to retain the sub-segments of the segments of the data object,
$M_I$ is the maximum data object transfer load,
$C_I$ is the current data object transfer load,
H is the file usage factor, and
(a) I is the file Inter activity factor.

41. The system of claim 38 wherein the second function is further dependent upon the file usage factor and the file interactivity factor.

42. The system of claim 41 wherein the second function to determine the remaining sub-segment sizes is:

$$SubSegn = max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_I/M_I - C_I) + H$$

where
$N_d$ is the number of data object storage devices available to retain the sub-segments of the segments of the data object,
$M_I$ is the maximum data object transfer load,
$C_I$ is the current data object transfer load, and
H is the file usage factor.

43. The system of claim 24 wherein the load balancing apparatus generates a listing of all copies of all segments of the requested data objects.

44. The system of claim 24 wherein a data object storage device having a copied segment of the requested data object is selected to transfer said data object to a requesting computing system.

45. The system of claim 24 wherein the load balancing apparatus comprises:
a presence determining device to determine the presence of all segments and sub-segments of the requested data object; and
a segment retrieving device which, if there are missing segments and sub-segments and sub-segments of the requested data object, said segment retrieving device assigns each of those missing segments and sub segments a file identification and file location, such that those missing segments are assigned to data object storage devices having the least loading, and then said segment retrieving device retrieves those missing segments from a back-up data object storage device.

46. The system of claim 24 wherein the load balancing apparatus further comprises:
a segment indicator that is set to indicate which of the segments of the data object to be transferred next; and
a current data object storage device indicator to specify initially a primary location of the segment identified by the segment indicatory;
whereby the load balancing apparatus performs the steps of:
a) determining if the loading of the data object storage device indicated by the current data object storage device indicator exceeds the maximum loading with transfer of the segment indicated by the segment indicator,
b) if said loading exceeds the maximum loading, seting the current data object storage device indicator to a next location of the segment indicated by the segment indicator, and
c) repeatedly executing steps a) and b) until said loading is not exceeded.

47. The system of claim 24 wherein transferring of the segments of the data object comprises the actions of reading said segments from the data object storage device, writing said segments to the data object storage device, and copying said segments from a said data object storage device to an alternate data object storage device, whereby said loading of the data object storage device is allocated between the reading, writing, and copying of the segments to prevent interference with said reading of the segments.

48. The system of claim 24 wherein the requested data object is a video data file to be streamed isochronously to the requesting computer system.

49. An apparatus for balancing a loading of data storage devices attached to multiple computing systems comprising:
means for acquiring a listing of locations of all segments of a requested data object including all copies of said segments and sub-segments of the requested data object;
means for evaluating the loading of the data storage devices attached to the multiple computing systems containing all copies of all segments of the requested data object;

means for selecting data storage devices containing copies of each segment of the data object having a least loading, which is less than a maximum loading for said data storage devices;

means for generating a sub-segment list for any segment of the requested data object residing on said data storage device would have a loading greater than the maximum loading if said segment of the requested data object were transferred, means for determining a load margin for all available data storage devices;

means for assigning locations for each sub-segment on each available data storage device having the least loading;

means for assigning file names to each sub-segment, whereby said means for generating a sub-segment list, said means for determining a load margin, said means for assigning locations for each sub-segment, and said means for assigning file names function if the loading of the data storage devices is greater than the maximum loading for said data storage devices;

means for selecting said each available data storage device containing each sub-segment; and means for transferring those segments of said requested data object to a requesting computer system.

50. The apparatus of claim 49 wherein means for generating the new sub-segment list comprises:

means for determining a number of all available data storage devices that may retain a plurality of sub-segments of said sub-segment of the requested data object;

means for determining a maximum data object transfer load for the available data storage devices;

means for assigning a minimum sub-segment size which is the smallest amount of data to be contained within one sub-segment of the segment;

means for calculating a first sub-segment size as a first function of a number of the data storage devices, the current digital data transfer load, the maximum digital data transfer load, and the minimum sub-segment size;

means for assigning a last sub-segment size as the minimum sub-segment size;

means for calculating all remaining sub-segment sizes as a second function of the number of the data storage devices, the current digital data transfer load, the maximum data object transfer load, and the minimum sub-segment size; and means for partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

51. The apparatus of claim 50 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the data object, and
f is determined by the formula:

$$f = N_d + (M_f/M_f - C_f)$$

where
$N_d$ is the number of data storage devices available to retain the sub-segments of the segments of the data object,
$M_f$ is the maximum data object transfer load, and
$C_f$ is the current data object transfer load.

52. The apparatus of claim 51 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_f/M_f - C_f)$$

where
$N_d$ is the number of data storage devices available to retain the sub-segments of the segments of the data object,
$M_f$ is the maximum data object transfer load, and
$C_f$ is the current data object transfer load.

53. The apparatus of claim 50 wherein the means for the new sub-segment list further comprises:

means for determining a file interactivity factor describing a number of jumps by the second computing system within the data object.

54. The apparatus of claim 53 wherein the first function is further dependent upon the file interactivity factor.

55. The apparatus of claim 54 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the data object, and
f is determined by the formula:

$$f = N_d + (m_f/M_f - C_f) + I$$

where
$N_d$ is the number of data storage devices available to retain the sub-segments of the segments of the data object,
$M_f$ is the maximum data object transfer load,
$C_f$ is the current data object transfer load, and
I is the file interactivity factor.

56. The medium of claim 55 wherein the requested data object is a video data file to be streamed isochronously to the requesting computer system.

57. The apparatus of claim 53 wherein the second function is further dependent upon the file interactivity factor.

58. The apparatus of claim 57 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the data object, and
f is determined by the formula:

$$f = N_d + (M_f/M_f - C) + I$$

where
- $N_d$ is the number of data storage devices available to retain the sub-segments of the segments of the data object,
- $M_I$ is the maximum data object transfer load,
- $C_I$ is the current data object transfer load, and
- I is the file Inter activity factor.

59. The apparatus of claim 50 wherein the means for generating the new sub-segment list further comprises the step of:
determining a file usage factor describing a number of requests for said data object for a period of time.

60. The apparatus of claim 59 wherein the first function is further dependent upon the file usage factor.

61. The apparatus of claim 60 wherein the first function to determine the first sub-segment size is:

$$SubSeg1 = min(SubSegSize_{min}, V/f)$$

where
- SubSeg1 is the first sub-segment size,
- min is the minimum function of two variables,
- V is a total size of a segment of the data object, and
- f is determined by the formula:

$$f = N_d + (M_I/M_I - C) + H$$

where
- $N_d$ is the number of data storage devices available to retain the sub-segments of the segments of the data object,
- $M_I$ is the maximum data object transfer load,
- $C_I$ is the current data object transfer load, and
- H is the file usage factor.

62. The apparatus of claim 59 wherein the second function is further dependent upon the file usage factor.

63. The apparatus of claim 62 wherein the second function to determine the remaining sub-segment sizes is:

$$SubSegn = max(SubSegSize_{min}, V/f)$$

where
- SubSegn is the a sub-segment size for one sub-segment of the remaining sub-segments,
- max is the maximum function of two variables,
- V is a total size of a segment of the data object, and
- f is determined by the formula:

$$f = N_d + (M_I/M_I - C_I) + H$$

where
- $N_d$ is the number of data storage devices available to retain the sub-segments of the segments of the data object,
- $M_I$ is the maximum data object transfer load,
- $C_I$ is the current data object transfer load, and
- H is the file usage factor.

64. The apparatus of claim 50 wherein the means for generating the new sub-segment list further comprises:
means for determining a file usage factor describing a number of requests for said data object for a period of time; and
means for determining a file interactivity factor describing a number of jumps by the second computing system within the data object.

65. The apparatus of claim 64 wherein the first function is further dependent upon the file usage factor and the file interactivity factor.

66. The apparatus of claim 65 wherein the first function to determine the first sub-segment size is:

$$SubSeg1 = min(SubSegSize_{min}, V/f)$$

where
- SubSeg1 is the first sub-segment size,
- min is the minimum function of two variables,
- V is a total size of a segment of the data object, and
- f is determined by the formula:

$$f = N_d + (M_I/M_I - C_I) + H + I$$

where
- $N_d$ is the number of data storage devices available to retain the sub-segments of the segments of the data object,
- $M_I$ is the maximum data object transfer load,
- $C_I$ is the current data object transfer load,
- H is the file usage factor, and
- I is the file Inter activity factor.

67. The apparatus of claim 64 wherein the second function is further dependent upon the file usage factor and the file interactivity factor.

68. The apparatus of claim 67 wherein the second function to determine the remaining sub-segment sizes is:

$$SubSegn = max(SubSegSize_{min}, V/f)$$

where
- SubSegn is the a sub-segment size for one sub-segment of the remaining sub-segments,
- max is the maximum function of two variables,
- V is a total size of a segment of the data object, and
- f is determined by the formula:

$$f = N_d + (M_I/M_I - C_I) + H$$

where
- $N_d$ is the number of data storage devices available to retain the sub-segments of the segments of the data object,
- $M_I$ is the maximum data object transfer load,
- $C_I$ is the current data object transfer load, and
- H is the file usage factor.

69. The apparatus of claim 49 further comprising:
means for determining the presence of all segments and sub-segments of the requested data object;
means for assigning each of those missing segments a file identification and file location, such that those missing segments are assigned to data storage devices having the least loading, if there are missing segments and sub-segments of the requested data object; and
means for retrieving those missing segments from a back-up data storage device.

70. The apparatus of claim 69 wherein the means for selecting the data storage devices containing copies of the segments and sub-segments of the requested data object and having the least loading comprises:
means for setting a current segment indicator to indicate which of the segments of the data object is to be transferred next;
means for setting a current data storage device indicator to specify a primary location of the segment to be transferred next;
means for incrementing the current data storage device indicator to a next location of the segment to be transferred, if the transfer of said segment causes the loading of the data storage device containing said segment to be exceeded; and
means for repeatedly activating said means for incrementing the current data storage device indicator until said loading is not exceeded.

71. The apparatus of claim 69 wherein transferring of the segments of the data object comprises the actions of reading said segments from the data storage device, writing said segments to the data storage device, and copying said segments from a said data storage device to an alternate data storage device, whereby said loading of the data storage device is allocated between the reading, writing, and copying of the segments to prevent interference with said reading of the segments.

72. The apparatus of claim 69 wherein the requested data object is a video data file to be streamed isochronously to the requesting computer system.

73. A medium for retaining a computer program which, when executed on a computing system, balances a loading of data storage devices attached to multiple computing systems, whereby said program executes the steps of:
   acquiring a listing of locations of all segments of a requested data object including all copies of said segments and sub-segments of the requested data object;
   evaluating the loading of the data storage devices attached to the multiple computing systems containing all copies of all segments of the requested data object;
   selecting data storage devices containing copies of each segment of the requested data object having a least loading, which is less than a maximum loading for said data storage devices;
   if the loading of the data storage devices is greater than the maximum loading for said data storage devices, generating a sub-segment list for any segment of the requested data object residing on said data storage device would have a loading greater than the maximum loading if said segment of the requested data object were transferred, determining a load margin for all available data storage devices, assigning locations for each sub-segment on each available data storage device having the least loading, and assigning file names to each sub-segment;
   selecting said each available data storage device containing each sub-segment; and
   transferring those segments of said requested data object to a requesting computer system.

74. The medium of claim 73 wherein generating the new sub-segment list comprises the steps of:
   determining a number of all available data storage devices that may retain a plurality of sub-segments of said sub-segment of the requested data object;
   determining a maximum data object transfer load for the available data storage devices;
   assigning a minimum sub-segment size which is the smallest amount of data to be contained within one sub-segment of the segment;
   calculating a first sub-segment size as a first function of a number of the data storage devices, the current digital data transfer load, the maximum digital data transfer load, and the minimum sub-segment size;
   assigning a last sub-segment size as the minimum sub-segment size;
   calculating all remaining sub-segment sizes as a second function of the number of the data storage devices, the current digital data transfer load, the maximum data object transfer load, and the minimum sub-segment size; and
   partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

75. The medium of claim 74 wherein the first function to determine the first sub-segment size is:

$$SubSeg1 = \min(SubSegSize_{min}, V/f)$$

where
   SubSeg1 is the first sub-segment size,
   min is the minimum function of two variables,
   V is a total size of a segment of the requested data object, and
   f is determined by the formula:

$$f = N_d + (M_I/M_I - C_I)$$

where
   $N_d$ is the number of data storage devices available to retain the sub-segments of the segments of the requested data object,
   $M_I$ is the maximum data object transfer load, and
   $C_I$ is the current data object transfer load.

76. The medium of claim 74 wherein the second function to determine the remaining sub-segment sizes is:

$$SubSegn = \max(SubSegSize_{min}, V/f)$$

where
   SubSegn is the a sub-segment size for one sub-segment of the remaining sub-segments,
   max is the maximum function of two variables,
   V is a total size of a segment of the requested data object, and
   f is determined by the formula:

$$f = N_d + (M_I/M_I - C_I)$$

where
   $N_d$ is the number of data storage devices available to retain the sub-segments of the segments of the requested data object,
   $M_I$ is the maximum data object transfer load, and
   $C_I$ is the current data object transfer load.

77. The medium of claim 74 wherein generating the new sub-segment list further comprises the step of:
   determining a file interactivity factor describing a number of jumps by the second computing system within the requested data object.

78. The medium of claim 77 wherein the first function is further dependent upon the file interactivity factor.

79. The medium of claim 78 wherein the first function to determine the first sub-segment size is:

$$SubSeg1 = \min(SubSegSize_{min}, V/f)$$

where
   SubSeg1 is the first sub-segment size,
   min is the minimum function of two variables,
   V is a total size of a segment of the requested data object, and
   f is determined by the formula:

$$f = N_d + (M_I/M_I - C_I) + I$$

where
   $N_d$ is the number of data storage devices available to retain the sub-segments of the segments of the requested data object,
   $M_I$ is the maximum data object transfer load,
   $C_I$ is the current data object transfer load, and
   I is the file interactivity factor.

80. The medium of claim 74 wherein the second function is further dependent upon the file interactivity factor.

81. The medium of claim 80 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the requested data object, and
f is determined by the formula:

$$f = N_d + (M_I/M_I - C_I) + I$$

where
$N_d$ is the number of data storage devices available to retain the sub-segments of the segments of the requested data object,
$M_I$ is the maximum data object transfer load,
$C_I$ is the current data object transfer load, and
I is the file Inter activity factor.

82. The medium of claim 74 wherein generating the new sub-segment list further comprises the step of:
determining a file usage factor describing a number of requests for said requested data object for a period of time.

83. The medium of claim 82 wherein the first function is further dependent upon the file usage factor.

84. The medium of claim 83 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the requested data object, and
f is determined by the formula:

$$f = N_d + (M_I/M_I - C_I) + H$$

where
$N_d$ is the number of data storage devices available to retain the sub-segments of the segments of the requested data object,
$M_I$ is the maximum data object transfer load,
$C_I$ is the current data object transfer load, and
H is the file usage factor.

85. The medium of claim 82 wherein the second function is further dependent upon the file usage factor.

86. The medium of claim 85 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the requested data object, and
f is determined by the formula:

$$f = N_d + (M_I/M_I - C_I) + H$$

where
$N_d$ is the number of data storage devices available to retain the sub-segments of the segments of the requested data object,
$M_I$ is the maximum data object transfer load,
$C_I$ is the current data object transfer load, and
H is the file usage factor.

87. The medium of claim 74 wherein generating the new sub-segment list further comprises the steps of:
determining a file usage factor describing a number of requests for said data object for a period of time; and
determining a file interactivity factor describing a number of jumps by the second computing system within the requested data object.

88. The medium of claim 87 wherein the first function is further dependent upon the file usage factor and the file interactivity factor.

89. The medium of claim 88 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of a segment of the requested data object, and
f is determined by the formula:

$$f = N_d + (M_I/M_I - C_I) + H + I$$

where
$N_d$ is the number of data storage devices available to retain the sub-segments of the segments of the requested data object,
$M_I$ is the maximum data object transfer load,
$C_I$ is the current data object transfer load,
H is the file usage factor, and
I is the file Inter activity factor.

90. The medium of claim 87 wherein the second function is further dependent upon the file usage factor and the file interactivity factor.

91. The medium of claim 90 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of a segment of the requested data object, and
f is determined by the formula:

$$f = N_d + (M_I/M_I - C_I) + H$$

where
$N_d$ is the number of data storage devices available to retain the sub-segments of the segments of the requested data object,
$M_I$ is the maximum data object transfer load,
$C_I$ is the current data object transfer load, and
H is the file usage factor.

92. The medium of claim 74 further comprising the steps of:
determining the presence of all segments and sub-segments of the requested data object;
if there are missing segments and sub-segments of the requested data object, assigning each of those missing segments a file identification and file location, such that those missing segments are assigned to data storage devices having the least loading; and
retrieving those missing segments from a back-up data storage device.

93. The medium of claim 92 wherein selecting the data storage devices containing copies of the segments and sub-segments of the requested data object and having the least loading comprises the steps of:
- setting a current segment indicator to indicate which of the segments of the data object is to be transferred next;
- setting a current data storage device indicator to specify a primary location of the segment to be transferred next;
- if the transfer of said segment causes the loading of the data storage device containing said segment to be exceeded, incrementing the current data storage device indicator to a next location of the segment to be transferred; and
- repeatedly incrementing the current data storage device indicator executing step G) until said loading is not exceeded.

94. The medium of claim 74 wherein transferring of the segments of the data object comprises the actions of reading said segments from the data storage device, writing said segments to the data storage device, and copying said segments from a said data storage device to an alternate data storage device, whereby said loading of the data storage device is allocated between the reading, writing, and copying of the segments to prevent interference with said reading of the segments.

95. A method for balancing a loading of data storage devices containing video data objects attached to multiple computing systems comprising the steps of:
- acquiring a listing of locations of all segments of a requested video data object including all copies of said segments of the requested video data object;
- evaluating the loading of the data storage devices attached to the multiple computing systems containing all copies of all segments of the reqested video data object;
- selecting data storage devices containing copies of each segment of the video data object having a least loading, which is less than a maximum loading for said data storage devices;
- if the loading of the data storage devices is greater than the maximum loading for said data storage devices, generating a sub-segment list for any segment of the requested video data object residing on said data storage device would have a loading greater than the maximum loading if said segment of the requested video data object were transferred, determining a load margin for all available data storage devices, assigning locations for each sub-segment on each available data storage device having the least loading, and assigning file names to each sub-segment;
- selecting said each available data storage device containing each sub-segment; and
- transferring those segments of said requested video data object to a requesting computer system.

96. The method of claim 95 wherein generating the new sub-segment list comprises the steps of:
- determining a number of all available data storage devices that may retain a plurality of sub-segments of said sub-segment of the requested video data object;
- determining a maximum video data object transfer load for the available data storage devices;
- assigning a minimum sub-segment size which is the smallest amount of data to be contained within one sub-segment of the segment;
- calculating a first sub-segment size as a first function of a number of the data storage devices, the current digital data transfer load, the maximum digital data transfer load, and the minimum sub-segment size;
- assigning a last sub-segment size as the minimum sub-segment size;
- calculating all remaining sub-segment sizes as a second function of the number of the data storage devices, the current digital data transfer load, the maximum video data object transfer load, and the minimum sub-segment size; and
- partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

97. The method of claim 96 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of the video data object, and
f is determined by the formula:

$$f = N_d + (M_I/M_I - C_I)$$

where
$N_d$ is the number of data storage devices available to retain the sub-segments of the video data object,
$M_I$ is the maximum video data object transfer load, and
$C_I$ is the current video data object transfer load.

98. The method of claim 96 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of the video data object, and
f is determined by the formula:

$$f = N_d + (M_I/M_I - C_I)$$

where
$N_d$ is the number of data storage devices available to retain the sub-segments of the video data object,
$M_I$ is the maximum video data object transfer load, and
$C_I$ is the current video data object transfer load.

99. The method of claim 96 wherein generating the new sub-segment list further comprises the step of:
- determining a file interactivity factor describing a number of jumps by the second computing system within the video data object.

100. The method of claim 99 wherein the first function is further dependent upon the file interactivity factor.

101. The method of claim 100 wherein the first function to determine the first sub-segment size is:

$$SubSeg1 = \min(SubSegSize_{min}, V/f)$$

where
SubSeg1 is the first sub-segment size,
min is the minimum function of two variables,
V is a total size of the video data object, and
f is determined by the formula:

$$f = N_d + (M_I/M_I - C_I) + I$$

where
- $N_d$ is the number of data storage devices available to retain the sub-segments of the video data object,
- $M_I$ is the maximum video data object transfer load,
- $C_I$ is the current video data object transfer load, and
- I is the file interactivity factor.

102. The method of claim 99 wherein the second function is further dependent upon the file interactivity factor.

103. The method of claim 102 wherein the second function to determine the remaining sub-segment sizes is:

$$SubSegn = \max(SubSegSize_{min}, V/f)$$

where
- SubSegn is the a sub-segment size for one sub-segment of the remaining sub-segments,
- max is the maximum function of two variables,
- V is a total size of the video data object, and
- f is determined by the formula:

$$f = N_d + (M_I/M_I - C_I) + I$$

where
- $N_d$ is the number of data storage devices available to retain the sub-segments of the video data object,
- $M_I$ is the maximum video data object transfer load,
- $C_I$ is the current video data object transfer load, and
- I is the file Inter activity factor.

104. The method of claim 96 wherein generating the new sub-segment list further comprises the step of:
determining a file usage factor describing a number of requests for said video data object for a period of time.

105. The method of claim 104 wherein the first function is further dependent upon the file usage factor.

106. The method of claim 105 wherein the first function to determine the first sub-segment size is:

$$SubSeg1 = \min(SubSegSize_{min}, V/f)$$

where
- SubSeg1 is the first sub-segment size,
- min is the minimum function of two variables,
- V is a total size of the video data object, and
- f is determined by the formula:

$$f = N_d + (M_I/M_I - C_I) + H$$

where
- $N_d$ is the number of data storage devices available to retain the sub-segments of the video data object,
- $M_I$ is the maximum video data object transfer load,
- $C_I$ is the current video data object transfer load, and
- H is the file usage factor.

107. The method of claim 104 wherein the second function is further dependent upon the file usage factor.

108. The method of claim 107 wherein the second function to determine the remaining sub-segment sizes is:

$$SubSegn = \max(SubSegSize_{min}, V/f)$$

where
- SubSegn is the a sub-segment size for one sub-segment of the remaining sub-segments,
- max is the maximum function of two variables,
- V is a total size of the video data object, and
- f is determined by the formula:

$$f = N_d + (M_I/M_I - C_I) + H$$

where
- $N_d$ is the number of data storage devices available to retain the sub-segments of the video data object,
- $M_I$ is the maximum video data object transfer load,
- $C_I$ is the current video data object transfer load, and
- H is the file usage factor.

109. The method of claim 96 wherein generating the new sub-segment list further comprises the steps of:
determining a file usage factor describing a number of requests for said video data object for a period of time; and
determining a file interactivity factor describing a number of jumps by the second computing system within the video data object.

110. The method of claim 109 wherein the first function is further dependent upon the file usage factor and the file interactivity factor.

111. The method of claim 110 wherein the first function to determine the first sub-segment size is:

$$SubSeg1 = \min(SubSegSize_{min}, V/f)$$

where
- SubSeg1 is the first sub-segment size,
- min is the minimum function of two variables,
- V is a total size of the video data object, and
- f is determined by the formula:

$$f = N_d + (M_I/M_I - C_I) + H + I$$

where
- $N_d$ is the number of data storage devices available to retain the sub-segments of the video data object,
- $M_I$ is the maximum video data object transfer load,
- $C_I$ is the current video data object transfer load,
- H is the file usage factor, and
- I is the file Inter activity factor.

112. The method of claim 109 wherein the second function is further dependent upon the file usage factor and the file interactivity factor.

113. The method of claim 112 wherein the second function to determine the remaining sub-segment sizes is:

$$SubSegn = \max(SubSegSize_{min}, V/f)$$

where
- SubSegn is the a sub-segment size for one sub-segment of the remaining sub-segments,
- max is the maximum function of two variables,
- V is a total size of the video data object, and
- f is determined by the formula:

$$f = N_d + (M_I/M_I - C_I) + H$$

where
- $N_d$ is the number of data storage devices available to retain the sub-segments of the video data object,
- $M_I$ is the maximum video data object transfer load,
- $C_I$ is the current video data object transfer load, and
- H is the file usage factor.

114. The method of claim 96 further comprising the steps of:
   determining the presence of all segments of the requested video data object;
   if there are missing segments of the requested video data object, assigning each of those missing segments a file identification and file location, such that those missing segments are assigned to data storage devices having the least loading; and
   retrieving those missing segments from a back-up data storage device.

115. The method of claim 96 wherein selecting the data storage devices containing copies of the segments of the requested video data object and having the least loading comprises the steps of:
   setting a current segment indicator to indicate which of the segments of the video data object is to be transferred next;
   setting a current data storage device indicator to specify a primary location of the segment to be transferred next;
   if the transfer of said segment causes the loading of the data storage device containing said segment to be exceeded, incrementing the current data storage device indicator to a next location of the segment to be transferred; and
   repeatedly incrementing the current data storage device indicator until said loading is not exceeded.

116. The method of claim 96 wherein transferring of the segments of the video data object comprises the actions of reading said segments from the data storage device, writing said segments to the data storage device, and copying said segments from a said data storage device to an alternate data storage device, whereby said loading of the data storage device is allocated between the reading, writing, and copying of the segments to prevent interference with said reading of the segments.

117. The method of claim 96 wherein the requested video data object is streamed isochronously to the requesting computer system.

118. A video data object service system in communication with a plurality of computing systems to provide at least one video data object of plurality of video data object to at least one of the plurality of computing system, comprising:
   a plurality of video data object storage devices in communication with each other and with any of the plurality of computing systems; and
   a load balancing apparatus in communication with the plurality of video data object storage devices to balance a loading of said video data object storage devices during transfer of said video data objects,
   said load balancing apparatus comprising:
      a load evaluator to assess the loading of the video data object storage devices containing segments of said video data objects,
      a video data object storage device selector to create a selection list to indicate selection of those video data object storage devices containing copies of each segment of a requested video data object having the least loading, and
      a copying initiator to initiate a copying and further segmenting of a segment of the video data object to an alternate video data object storage devices having low loading if all video data object storage devices containing said segment have a loading greater than a maximum loading, whereby said copying initiator generates a sub-segment list for any segment of the requested video data object residing on said video data object storage device that would have a loading greater than the maximum loading if said segment of the requested video data object were transferred, determines a load margin for all available video data object storage devices, assigns locations for each sub-segment on each available video data object storage device having the least loading, and assigns file names to each sub-segment.

119. The system of claim 118 wherein generating the new sub-segment list comprises the steps of:
   determining a number of all available video data object storage devices that may retain a plurality of sub-segments of said sub-segment of the requested video data object;
   determining a maximum video data object transfer load for the available video data object storage devices;
   assigning a minimum sub-segment size which is the smallest amount of data to be contained within one sub-segment of the segment;
   calculating a first sub-segment size as a first function of a number of the video data object storage devices, the current digital data transfer load, the maximum digital data transfer load, and the minimum sub-segment size;
   assigning a last sub-segment size as the minimum sub-segment size;
   calculating all remaining sub-segment sizes as a second function of the number of the video data object storage devices, the current digital data transfer load, the maximum video data object transfer load, and the minimum sub-segment size; and
   partitioning said segment into sub-segments whereby the first sub-segment of the segment is of the first sub-segment size, the last sub-segment of the segment is of the last sub-segment size, and all the remaining sub-segments of the segment is of the remaining sub-segment sized.

120. The system of claim 119 wherein the first function to determine the first sub-segment size is:

$$SubSeg1 = \min(SubSegSize_{min}, V/f)$$

where
   SubSeg1 is the first sub-segment size,
   min is the minimum function of two variables,
   V is a total size of the video data object, and
   f is determined by the formula:

$$f = N_d + (M_I/M_I - C_I)$$

where
      $N_d$ is the number of video data object storage devices available to retain the sub-segments of the video data object,
      $M_I$ is the maximum video data object transfer load, and
      $C_I$ is the current video data object transfer load.

121. The system of claim 119 wherein the second function to determine the remaining sub-segment sizes is:

$$SubSegn = \max(SubSegSize_{min}, V/f)$$

where
   SubSegn is the a sub-segment size for one sub-segment of the remaining sub-segments,
   max is the maximum function of two variables,
   V is a total size of the video data object, and
   f is determined by the formula:

$$f = N_d + (M_I/M_I - C_I)$$

where

N_d is the number of video data object storage devices available to retain the sub-segments of the video data object, M_t is the maximum video data object transfer load, and C_I is the current video data object transfer load.

122. The system of claim 119 wherein generating the new sub-segment list further comprises the step of:
determining a file interactivity factor describing a number of jumps by the second computing system within the video data object.

123. The system of claim 122 wherein the first function is further dependent upon the file interactivity factor.

124. The system of claim 123 wherein the first function to determine the first sub-segment size is:

$$SubSeg1 = \min(SubSegSize_{min}, V/f)$$

where

SubSeg1 is the first sub-segment size,
min is the minimum function of two variables,
V is a total size of the video data object, and
f is determined by the formula:

$$f = N_d + (M_T/M_T - C_I) + I$$

where

N_d is the number of video data object storage devices available to retain the sub-segments of the video data object, M_I is the maximum video data object transfer load,
C_I is the current video data object transfer load, and I is the file interactivity factor.

125. The system of claim 122 wherein the second function is further dependent upon the file interactivity factor.

126. The system of claim 125 wherein the second function to determine the remaining sub-segment sizes is:

$$SubSegn = \max(SubSegSize_{min}, V/f)$$

where

SubSegn is the a sub-segment size for one sub-segment of the remaining sub-segments,
max is the maximum function of two variables,
V is a total size of the video data object, and
f is determined by the formula:

$$f = N_d(M_T/M_T - C_I) + I$$

where

N_d is the number of video data object storage devices available to retain the sub-segments of the video data object, M_I is the maximum video data object transfer load,
C_I is the current video data object transfer load, and I is the file Inter activity factor.

127. The system of claim 119 wherein generating the new sub-segment list further comprises the step of:
determining a file usage factor describing a number of requests for said video data object for a period of time.

128. The system of claim 127 wherein the first function is further dependent upon the file usage factor.

129. The system of claim 128 wherein the first function to determine the first sub-segment size is:

$$SubSeg1 = \min(SubSegSize_{min}, V/f)$$

where

SubSeg1 is the first sub-segment size,
min is the minimum function of two variables,
V is a total size of the video data object, and
f is determined by the formula:

$$f = N_d + (M_T/M_T - C_I) + H$$

where

N_d is the number of video data object storage devices available to retain the sub-segments of the video data object, M_I is the maximum video data object transfer load,
C_I is the current video data object transfer load, and H is the file usage factor.

130. The system of claim 127 wherein the second function is further dependent upon the file usage factor.

131. The system of claim 130 wherein the second function to determine the remaining sub-segment sizes is:

$$SubSegn = \max(SubSegSize_{min}, V/f)$$

where

SubSegn is the a sub-segment size for one sub-segment of the remaining sub-segments,
max is the maximum function of two variables,
V is a total size of the video data object, and
f is determined by the formula:

$$f = N_d + (M_T/M_T - C_I) + H$$

where

N_d is the number of video data object storage devices available to retain the sub-segments of the video data object, M_I is the maximum video data object transfer load,
C_I is the current video data object transfer load, and H is the file usage factor.

132. The system of claim 119 wherein generating the new sub-segment list further comprises the steps of:
determining a file usage factor describing a number of requests for said video data object for a period of time; and
determining a file interactivity factor describing a number of jumps by the second computing system within the video data object.

133. The system of claim 132 wherein the first function is further dependent upon the file usage factor and the file interactivity factor.

134. The system of claim 133 wherein the first function to determine the first sub-segment size is:

$$SubSeg1 = \min(SubSegSize_{min}, V/f)$$

where

SubSeg1 is the first sub-segment size,
min is the minimum function of two variables,
V is a total size of the video data object, and
f is determined by the formula:

$$f = N_d + (M_T/M_T - C_I) + H + I$$

where

N_d is the number of video data object storage devices available to retain the sub-segments of the video data object, M_I is the maximum video data object transfer load,
C_I is the current video data object transfer load,
H is the file usage factor, and
I is the file Inter activity factor.

135. The system of claim 132 wherein the second function is further dependent upon the file usage factor and the file interactivity factor.

136. The system of claim 135 wherein the second function to determine the remaining sub-segment sizes is:

$$SubSegn = \max(SubSegSize_{min}, V/f)$$

where
SubSegn is the a sub-segment size for one sub-segment of the remaining sub-segments,
max is the maximum function of two variables,
V is a total size of the video data object, and
f is determined by the formula:

$$f = N_d + (M_I/M_I - C_I) + H$$

where
$N_d$ is the number of video data object storage devices available to retain the sub-segments of the video data object,
$M_I$ is the maximum video data object transfer load,
$C_I$ is the current video data object transfer load, and
H is the file usage factor.

137. The system of claim 118 wherein the load balancing apparatus generates a listing of all copies of all segments of the requested video data objects.

138. The system of claim 118 wherein one video data object storage device having a copied segment of the requested video data object is selected to transfer said video data object to a requesting computing system.

139. The system of claim 118 wherein the load balancing apparatus comprises:
a presence determining device to determine the presence of all segments of the requested video data object; and
a segment retrieving device which, if there are missing segments of the requested video data object, said segment retrieving device assigns each of those missing segments a file identification and file location, such that those missing segments are assigned to video data object storage devices having the least loading, and then said segment retrieving device retrieves those missing segments from a back-up video data object storage device.

140. The system of claim 118 wherein the load balancing apparatus further comprises:
a segment indicator that is set to indicate which of the segments of the video data object to be transferred next; and
a current video data object storage device indicator to specify initially a primary location of the segment identified by the segment indicatory;
whereby the load balancing apparatus performs the steps of:
a) determining if the loading of the video data object storage device indicated by the current video data object storage device indicator exceeds the maximum loading with transfer of the segment indicated by the segment indicator,
b) if said loading exceeds the maximum loading, setting the current video data object storage device indicator to a next location of the segment indicated by the segment indicator, and
c) repeatedly executing steps a) and b) until said loading is not exceeded.

141. The system of claim 118 wherein transferring of the segments of the video data object comprises the actions of reading said segments from the video data object storage device, writing said segments to the video data object storage device, and copying said segments from a said video data object storage device to an alternate video data object storage device, whereby said loading of the video data object storage device is allocated between the reading, writing, and copying of the segments to prevent interference with said reading of the segments.

142. The system of claim 118 wherein the requested video data object is streamed isochronously to the requesting computer system.

* * * * *

UNITED STATES PATENT AND TRADEMARK OFFICE
CERTIFICATE OF CORRECTION

| | |
|---|---|
| PATENT NO. | : 7,039,784 B1 |
| APPLICATION NO. | : 10/027991 |
| DATED | : May 2, 2006 |
| INVENTOR(S) | : Monsong Chen et al. |

It is certified that error appears in the above-identified patent and that said Letters Patent is hereby corrected as shown below:

In the Assignee in item (73), delete "Info Value Computing Inc., Elmsford, NY (US)" and replace with -- InfoValue Computing Inc., Elmsford, NY (US)--.

In the Inventors in item (75), delete "Aparna Pappu, Whjite Plain, NY (US)" and replace with -- Aparna Pappu, White Plains, NY (US)--.

Signed and Sealed this

Twenty-fifth Day of July, 2006

JON W. DUDAS
*Director of the United States Patent and Trademark Office*